(12) United States Patent
Abe et al.

(10) Patent No.: US 10,975,182 B2
(45) Date of Patent: Apr. 13, 2021

(54) POLAR GROUP-CONTAINING OLEFIN COPOLYMER, MULTINARY POLAR OLEFIN COPOLYMER, OLEFIN RESIN COMPOSITION, AND ADHESIVE MATERIAL, LAMINATE, AND OTHER APPLICATION PRODUCTS USING SAME

(71) Applicants: JAPAN POLYETHYLENE CORPORATION, Chiyoda-ku (JP); JAPAN POLYPROPYLENE CORPORATION, Chiyoda-ku (JP)

(72) Inventors: Kazunari Abe, Kanagawa (JP); Minoru Kobayashi, Mie (JP); Hideshi Uchino, Mie (JP); Hiroyuki Shimizu, Kanagawa (JP); Tetsuya Morioka, Mie (JP); Naoshi Iwama, Mie (JP)

(73) Assignees: JAPAN POLYETHYLENE CORPORATION, Chiyoda-ku (JP); JAPAN POLYPROPYLENE CORPORATION, Chiyoda-ku (JP)

( * ) Notice: Subject to any disclaimer, the term of this patent is extended or adjusted under 35 U.S.C. 154(b) by 0 days.

(21) Appl. No.: 16/147,980

(22) Filed: Oct. 1, 2018

(65) Prior Publication Data
US 2019/0062473 A1 Feb. 28, 2019

Related U.S. Application Data

(63) Continuation of application No. 14/368,059, filed as application No. PCT/JP2012/083367 on Dec. 21, 2012, now abandoned.

(30) Foreign Application Priority Data

Dec. 23, 2011 (JP) ................... 2011-282521
Mar. 30, 2012 (JP) ................... 2012-080294
Mar. 31, 2012 (JP) ................... 2012-083336

(51) Int. Cl.
*C08F 220/02* (2006.01)
*C08F 220/06* (2006.01)
(Continued)

(52) U.S. Cl.
CPC ........ *C08F 210/02* (2013.01); *B29C 45/0001* (2013.01); *B32B 1/08* (2013.01); *B32B 5/022* (2013.01); *B32B 5/024* (2013.01); *B32B 7/12* (2013.01); *B32B 9/045* (2013.01); *B32B 15/085* (2013.01); *B32B 15/092* (2013.01); *B32B 23/08* (2013.01); *B32B 27/08* (2013.01); *B32B 27/10* (2013.01); *B32B 27/32* (2013.01); *B32B 27/327* (2013.01); *B32B 27/38* (2013.01); *C08F 4/7001* (2013.01); *C08F 220/02* (2013.01); *C08F 220/06* (2013.01); *C08F 220/08* (2013.01); *C08F 220/18* (2013.01); *C08F 236/04* (2013.01); *C08J 5/18* (2013.01); *C08L 23/04* (2013.01); *C08L 23/06* (2013.01); *C08L 23/0815* (2013.01); *C08L 23/0869* (2013.01); *C09D 123/0869* (2013.01); *C09J 7/20* (2018.01); *C09J 123/04* (2013.01); *C09J 123/0869* (2013.01); *B29K 2023/08* (2013.01); *B32B 2250/02* (2013.01); *B32B 2250/24* (2013.01); *B32B 2250/242* (2013.01); *B32B 2270/00* (2013.01); *B32B 2323/00* (2013.01); *B32B 2333/00* (2013.01); *B32B 2363/00* (2013.01); *B32B 2405/00* (2013.01); *B32B 2439/60* (2013.01); *B32B 2553/00* (2013.01); *C08J 2323/08* (2013.01); *C08J 2477/00* (2013.01); *C08L 2203/16* (2013.01); *C08L 2205/02* (2013.01); *C08L 2205/025* (2013.01); *C08L 2207/062* (2013.01); *C08L 2207/066* (2013.01); *Y10T 428/1393* (2015.01);
(Continued)

(58) Field of Classification Search
CPC .... C08F 220/06; C08F 220/08; C08F 220/10; C08F 4/7001; C08F 220/02
See application file for complete search history.

(56) References Cited

U.S. PATENT DOCUMENTS 4,751,270 A 6/1988 Urawa et al.
7,393,907 B2 7/2008 Imuta et al.
(Continued)

FOREIGN PATENT DOCUMENTS

CN 1342173 A 3/2002
CN 1342715 A 4/2002
(Continued)

OTHER PUBLICATIONS

Office Action dated Apr. 15, 2019 in Indian Patent Application No. 5090/DELNP/2014 with English translation.
(Continued)

*Primary Examiner* — Caixia Lu
(74) *Attorney, Agent, or Firm* — Oblon, McClelland, Maier & Neustadt, L.L.P.

(57) ABSTRACT

The present invention relates to a polar group-containing olefin copolymer (A') which is produced through polymerization using a transition metal catalyst, which has a weight-average molecular weight falling within a specific range and which contains a polar group-containing monomer within a specific range; a multinary polar olefin copolymer (A") indispensably containing a polar monomer component that has a norbornene skeleton and a carboxyl group or an acid anhydride group and having three or more types of monomer units; and a resin composition (C) containing a specific amount of a polar group-containing olefin copolymer (A) and a specific amount of an olefin resin (B).

12 Claims, 3 Drawing Sheets

(51) Int. Cl.
*C08F 220/08* (2006.01)
*C08F 4/70* (2006.01)
*C08F 210/02* (2006.01)
*B32B 7/12* (2006.01)
*B32B 27/32* (2006.01)
*C08L 23/04* (2006.01)
*C09J 123/04* (2006.01)
*B32B 27/08* (2006.01)
*C09J 7/20* (2018.01)
*C08F 236/04* (2006.01)
*B29C 45/00* (2006.01)
*B32B 1/08* (2006.01)
*B32B 5/02* (2006.01)
*B32B 9/04* (2006.01)
*B32B 15/085* (2006.01)
*B32B 15/092* (2006.01)
*B32B 23/08* (2006.01)
*B32B 27/10* (2006.01)
*B32B 27/38* (2006.01)
*C08F 220/18* (2006.01)
*C08J 5/18* (2006.01)
*C08L 23/06* (2006.01)
*C08L 23/08* (2006.01)
*C09D 123/08* (2006.01)
*C09J 123/08* (2006.01)
*B29K 23/00* (2006.01)

(52) U.S. Cl.
CPC *Y10T 428/31511* (2015.04); *Y10T 428/31529* (2015.04); *Y10T 428/31692* (2015.04); *Y10T 428/31696* (2015.04); *Y10T 428/31855* (2015.04); *Y10T 428/31884* (2015.04); *Y10T 428/31895* (2015.04); *Y10T 428/31909* (2015.04); *Y10T 428/31924* (2015.04); *Y10T 428/31931* (2015.04); *Y10T 442/3886* (2015.04); *Y10T 442/678* (2015.04)

(56) References Cited

U.S. PATENT DOCUMENTS

| | | | |
|---|---|---|---|
| 7,524,905 | B2 | 4/2009 | Conner et al. |
| 7,714,087 | B2 | 5/2010 | Imuta et al. |
| 7,897,709 | B2 | 3/2011 | Makio et al. |
| 8,017,693 | B2 | 9/2011 | Makio et al. |
| 8,129,475 | B2 | 3/2012 | Makio et al. |
| 2001/0029288 | A1 | 10/2001 | Oshima et al. |
| 2002/0156207 | A1 | 10/2002 | Imuta et al. |
| 2003/0114623 | A1 | 6/2003 | Mitani et al. |
| 2004/0122192 | A1 | 6/2004 | Imuta et al. |
| 2005/0065302 | A1 | 3/2005 | Mitani et al. |
| 2006/0270814 | A1 | 11/2006 | Makio et al. |
| 2007/0010639 | A1 | 1/2007 | Makio et al. |
| 2007/0255027 | A1 | 11/2007 | Jung et al. |
| 2008/0207854 | A1 | 8/2008 | Conner et al. |
| 2009/0118426 | A1 | 5/2009 | Mitani et al. |
| 2009/0137757 | A1 | 5/2009 | Imuta et al. |
| 2009/0281260 | A1 | 11/2009 | Makio et al. |
| 2009/0326174 | A1 | 12/2009 | Scott et al. |
| 2011/0196118 | A1 | 8/2011 | Makio et al. |
| 2011/0213110 | A1 | 9/2011 | Shimizu et al. |
| 2011/0257351 | A1 | 10/2011 | Kobayashi et al. |

FOREIGN PATENT DOCUMENTS

| | | |
|---|---|---|
| CN | 1613881 A | 5/2005 |
| CN | 101255216 A | 9/2008 |
| EP | 0 589 527 A1 | 3/1994 |
| EP | 1 100 832 A1 | 5/2001 |
| JP | 50-004144 A | 1/1975 |
| JP | 63-291937 A | 11/1988 |
| JP | 1-168705 A | 7/1989 |
| JP | 03-011290 B2 | 2/1991 |
| JP | 03-229713 A | 10/1991 |
| JP | 06-184214 A | 7/1994 |
| JP | 2792982 B2 | 6/1998 |
| JP | 2001-98026 A | 4/2001 |
| JP | 2001-172322 | 6/2001 |
| JP | 1 186 619 A2 | 3/2002 |
| JP | 2002-145944 A | 5/2002 |
| JP | 2002-145947 A | 5/2002 |
| JP | 2002-145948 A | 5/2002 |
| JP | 2002-155109 A | 5/2002 |
| JP | 2002-521534 A | 7/2002 |
| JP | 3603785 B2 | 12/2004 |
| JP | 2005-097587 A | 4/2005 |
| JP | 2005-097588 A | 4/2005 |
| JP | 2006-131707 A | 5/2006 |
| JP | 2007-46032 A | 2/2007 |
| JP | 3969919 B2 | 9/2007 |
| JP | 2008-223011 A | 9/2008 |
| JP | 2009-155655 A | 7/2009 |
| JP | 2009-155656 A | 7/2009 |
| JP | 2009-535444 A | 10/2009 |
| JP | 2010-150246 A | 7/2010 |
| JP | 2010-150532 A | 7/2010 |
| JP | 2010-202647 A | 9/2010 |
| JP | 2010-260913 A | 11/2010 |
| JP | 4672214 B2 | 4/2011 |
| JP | 2011-88831 A | 5/2011 |
| JP | 2011-137120 A | 7/2011 |
| JP | 2011-525211 A | 9/2011 |
| JP | 2011-256167 A | 12/2011 |
| WO | 00/06615 A1 | 2/2000 |
| WO | 03/057747 A1 | 7/2003 |
| WO | 2010/050256 A1 | 5/2010 |
| WO | 2010/058849 A1 | 5/2010 |

OTHER PUBLICATIONS

European Office Action dated Apr. 15, 2018 in Patent Application No. 12 860 244.8, 4pages.
Office Action dated Apr. 7, 2017 in European Patent Application No. 12 860 244.8.
Office Action dated Jul. 26, 2016 in Japanese Patent Application No. 2013-056086 (with unedited computer generated English translation).
Office Action dated Jun. 14, 2016 in Japanese Patent Application No. 2013-061129 (with unedited computer generated English translation).
Office Action dated May 9, 2016 in Japanese Patent Application No. 2013-056086 (with English language translation).
Office Action dated Apr. 13, 2016 in Chinese Patent Application No. 201280064183.2 (with English translation).
Extended Search Report dated Jan. 28, 2016 in European Patent Application No. 12860244.8.
Combined Chinese Office Action and Search Report dated Aug. 31, 2015 in Patent Application No. 201280064183.2 (with unedited computer generated English translation and English translation of categories of cited documents).
Partial Supplementary European Search Report dated Aug. 24, 2015 in Patent Application No. 12860244.8.
Frank A. Leibfarth, et al. "Ketene Functionalized Polyethylene: Control of Cross-Link Density and Material Properties" Journal of American Chemical Society, vol. 132, No. 42, XP055194939, pp. 14706-14709, Oct. 27, 2010.
Eric F. Connor, et al. "Linear Functionalized Polyethylene Prepared with Highly Active Neutral Ni(II) Complexes" Journal of Polymer Science: Part A: Polymer Chemistry, vol. 40, No. 16, XP008136881, pp. 2842-2854, Aug. 15, 2002.
Office Action dated Jun. 23, 2015 in Japanese Patent Application No. 2012-279994 (with English translation).
International Search Report dated Apr. 2, 2013 in PCT/JP2012/083367.
Jean-Christophe Daigle, et al., "Preparation of functional polyethylenes by catalytic copolymerization", Macromolecules, vol. 44, pp. 1760-1762, Mar. 4, 2011.

(56) References Cited

OTHER PUBLICATIONS

Takuya Kochi, et al., "Formation of linear copolymers of ethylene and acrylonitrile catalyzed by phosphine sulfonate palladium complexes", J. Am. Chem. Soc., vol. 129, No. 29, pp. 8948-8949, 2007.

Shuji Luo, et al., "Copolymerization of ethylene and alkyl vinyl ethers by a (phosphine-sulfonate)PdMe catalyst", J. Am. Chem. Soc., vol. 129, No. 29, pp. 8946-8947, 2007.

Shengsheng Liu, et al., "Synthesis of palladium complexes with an anionic PIO chelate and their use in copolymerization of ethene with functionalized norbornene derivatives: Unusual functionality tolerance", Organometallics, vol. 26, No. 1, pp. 210-216 and Cover Page, 2007.

POLAR GROUP-CONTAINING OLEFIN COPOLYMER, MULTINARY POLAR OLEFIN COPOLYMER, OLEFIN RESIN COMPOSITION, AND ADHESIVE MATERIAL, LAMINATE, AND OTHER APPLICATION PRODUCTS USING SAME

TECHNICAL FIELD

The present invention relates to a polar group-containing olefin copolymer, a multinary polar olefin copolymer and an olefin resin composition, and to an adhesive material, a laminate and other application products using the same, and more precisely, relates to a polar group-containing olefin copolymer, a multinary polar olefin copolymer and an olefin resin composition having a specific polar group and having excellent adhesiveness to various substrate materials, and to an adhesive material, a laminate and other application products using the performance thereof.

BACKGROUND ART

In general, olefin polymers such as polyethylene and polypropylene have high mechanical strength, are excellent in chemical resistance and corrosion resistance, inexpensive and excellent in moldability, and have environmental suitability, and are therefore valued as industrial materials, and for example, through injection molding, extrusion molding, blow molding or the like, such polymers are molded into films, laminates, containers, blow-molded bottles or the like and are used in wide-range applications.

Further, as laminated with a substrate of a gas-barrier material such as EVOH or aluminium foil, the polymers may be further given other properties such as gas barrier property in addition to the above-mentioned characteristics, and can therefore provide high-function wrapping materials and containers.

However, olefin polymers are generally nonpolar, and therefore in using them for laminate materials, they have some drawbacks in that their adhesive strength to different types of materials having high polarity such as other synthetic resins metals, wood and the like is extremely low or the polymers could not adhere to those materials.

Given the situation, there is widely employed a method of grafting the polymers with a polar group-containing monomer using an organic peroxide, for improving the adhesiveness of the polymers to other high-polar materials (for example, see PTL 1).

However, according to the method, there may occur intermolecular crosslinking of the olefin polymer molecules and molecular chain cutting of the olefin polymers along with the grafting reaction thereof, and therefore the method is problematic in that the graft-modified derivatives could not maintain the excellent physical properties of polyolefins.

For example, introduction of any unnecessary long-chain branches through intermolecular crosslinking may increase the melt viscosity and broaden the molecular weight distribution, therefore having some negative influences on the adhesiveness and the moldability of the polymers. In addition, molecular chain break may increase low-molecular-weight fragments of polyolefin, therefore bringing about some problems of burr formation and fuming during molding.

The adhesiveness to other high-polar materials may be increased by increasing the polar group content during olefin copolymerization; however, it is not easy to graft a polyolefin with a large amount of a polar group-containing monomer through graft modification. As a method of increasing the content of the polar group-containing monomer, for example, there may be taken into consideration a method of increasing the amount of the polar group-containing monomer and the amount of the organic peroxide to be subjected to graft modification. The method, when employed, would bring about further intermolecular crosslinking and molecular chain break of olefin polymers, therefore detracting from the physical properties of polyolefins. In addition, the amount of the unreacted polar group-containing monomer and the amount of the decomposed product of the organic peroxide that may remain in the resin would increase, therefore bringing about other troubles that the resin degradation would be promoted and some offensive odor may come into existence. Consequently, the attempt to increase the content of the polar group-containing monomer in the resin is naturally limited.

As a method of solving the problem that occurs in graft modification, there has been illustrated a method for producing a modified derivative having a high grafting efficiency, in which a linear LDPE is used as the graft modification material to thereby prevent the graft-modified derivative from being contaminated and to reduce the intermolecular crosslinking that may occur during graft modification (see PTL 2).

However, the effect of preventing intermolecular crosslinking and improving the graft efficiency is limitative, and in addition, it is impossible to prevent the formation of residues of the unreacted polar group-containing monomer and the decomposed product of organic peroxide that are fundamental harmful results in graft modification, or that is, the method could not as yet be a sufficient improved method.

On the other hand, as a method of incorporating a polar group-containing monomer into an olefin polymer with neither intermolecular crosslinking and gelation of olefin polymer molecules nor molecular chain break thereof, there has also been disclosed a method of obtaining a polar group-containing olefin copolymer, in which a high-pressure radical polymerization process is used and ethylene and a polar group-containing vinyl monomer are copolymerized (for example, see PTL 3 and PTL 4).

An example of the molecular structure of an olefin copolymer into which a polar group has been introduced according to a high-pressure radical polymerization process is shown in FIG. 1A. The method can solve the problem with graft modification and can increase the content of the polar group-containing monomer in the olefin copolymer as compared with that in graft modification. However, since the polymerization process is a high-pressure radical process, the obtained polar group-containing olefin copolymer has a molecular structure that randomly comprises long-chain branches and short-chain branches. Consequently, as compared with olefin copolymers to be produced through polymerization with a metal catalyst, only a polar group-containing olefin copolymer having a low elastic modulus and low mechanical properties can be obtained, and the range of application to the use that requires high strength is limitative.

On the other hand, in a polymerization method using a metallocene catalyst that has heretofore ordinarily used in the art, it has been said that the catalyst polymerization activity of ethylene and polar group-containing monomer lowers and therefore the two are difficult to copolymerize; however, recently, there has been proposed a method of producing a polar group-containing olefin copolymer through polymerization in the presence of a late transition metal complex catalyst that is referred to as a so-called postmetallocene (see PTL 5 to 8).

According to these methods, it is possible to make the polymers have a high elastic modulus and have a high mechanical strength and to increase the polar group content in the polymers, as compared with the olefin copolymer to be obtained according to a high-pressure radical polymerization process (in this connection, images of the molecular structure of the olefin copolymer produced through polymerization using a transition metal catalyst are shown in FIG. 1B and FIG. 1C). However, the keynote of the methods described in these references essentially resides in copolymers of an acrylate group-containing monomer such as methyl acrylate or ethyl acrylate or a specific polar group-containing monomer such as vinyl acetate with ethylene or an α-olefin; and the adhesiveness of those polar group-containing polyolefins having such a functional group to other high-polar materials is not sufficient. Heretofore, as polar comonomers, there has been reported acrylates (PTL 16 to 18, 5 to 7), acrylonitriles (NPL 1), vinyl ethers (NPL 2), etc. Also there has been reported copolymerization using a norbornene skeleton-having polar comonomer (NPL 3). However, as a result of evaluations made by the present inventors, their performance is insufficient (in particular, for adhesiveness, see Examples of the present application shown hereinunder). In addition, there has also been reported a production method for a multinary copolymer using a norbornene polar comonomer (PTL 19); however, the method is limited to production of an acrylate copolymer having a low olefin content by the use of a radical polymerization catalyst.

Concrete adhesion performance to different types of high-polar materials is not referred to in any references; and use of a specific polar group-containing olefin copolymer for adhesion performance is not disclosed anywhere. Further, nothing is referred to anywhere, relating to adhesion performance of a resin composition comprising a polar group-containing olefin copolymer and any other olefin resin.

Furthermore, a carboxyl group or derivatives thereof are known as a polar group which, when introduced into an olefin copolymer, can express excellent adhesiveness to different types of high-polar materials. There has been proposed a polar group-containing olefin copolymer produced through copolymerization of (2,7-octadien-1-yl)succinic anhydride and ethylene and an α-olefin in the presence of a specific metallocene catalyst and a sufficient amount of an organic aluminium, as an olefin copolymer that is a polar group-containing olefin copolymer containing a carboxyl group or a derivative thereof and that is produced through polymerization not according to a high-pressure radical polymerization process (see PTL 9).

However, according to that invention, the polar group-containing olefin copolymerization requires a large amount of organic aluminium, and therefore the product cost is inevitably high. In addition, such a large amount of an organic aluminium exists in the copolymer as an impurity therein, and removing it results in further cost increases. Further, the advantageous effect of that invention is mainly for producing a polar group-containing olefin copolymer at high polymerization activity, and nothing is referred to in the reference relating to concrete adhesion performance to different types of high-polar materials. Moreover, in the patent reference, nothing is referred to at all relating to the resin properties necessary for the polar group-containing olefin copolymer to have sufficient adhesiveness to different types of high-polar materials, and use of the olefin copolymer targeted to high adhesion performance is not disclosed therein. Furthermore, nothing is referred to at all therein, relating to the adhesion performance of a resin composition comprising a polar group-containing olefin copolymer and any other olefin resin.

As other polar group-containing olefin copolymer, there has been proposed a functional group-having olefin copolymer that comprises a specific structure-having polar group-containing monomer and a structural unit derived from ethylene, an α-olefin and a non-conjugated diene (see PTL 10).

However, the production method for the polar group-containing olefin copolymer proposed by that patent reference requires previous masking of the polar group through reaction the polar group-containing cyclic olefin to be used for polymerization with an organic metal compound, and further requires demasking treatment after the copolymerization step, and therefore, the constitutive steps of the production method are complicated and the production cost thereof is therefore inevitably high. Further, the organic metal compound used for the masking may remain in the copolymer, therefore having some negative influence on various resin properties, and removing the residue would result in further increase in the production cost. Moreover, in the reference, nothing is referred to at all, relating to the adhesion performance of the resin composition comprising the polar group-containing olefin copolymer and any other olefin resin.

As a production method for a different polar group-containing olefin copolymer, there have been disclosed methods of introducing a polar group into the molecular chain by modifying the double bond part of an olefin copolymer having a double bond in one end or both ends of the polymer chain or inside the molecular chain thereof (see PTL 11 to 15). In case where a polar group-containing olefin copolymer is produced according to these methods, it is necessary to take a step of previously preparing an olefin polymer having a double bond in the molecular chain through polymerization followed by reacting the double bond part in the olefin copolymer with a polar group-containing compound; and as compared with the case of obtaining a polar group-containing olefin copolymer through direct copolymerization of a polar group-containing vinyl monomer and ethylene or an α-olefin, the production process is complicated and the product cost therefore increases. Further, in the case of obtaining the polar group-containing olefin copolymer through modification of an olefin copolymer having a double bond at one end or at both ends, it is impossible to separately control the molecular weight of the polymer chain and the polar group content, from the principle of the method, and as a result, the use of the obtained polar group-containing olefin copolymer is to be limitative. Moreover, nothing is referred to at all in the reference, relating to the adhesion performance of the resin composition comprising the polar group-containing olefin copolymer and any other olefin resin.

CITATION LIST

Patent Literature

PTL 1: JP-A 50-004144
PTL 2: JP-B 3-11290
PTL 3: Japanese Patent 2792982
PTL 4: JP-A 3-229713
PTL 5: JP-A 2010-202647
PTL 6: JP-A 2010-150532
PTL 7: JP-A 2010-150246

PTL 8: JP-A 2010-260913
PTL 9: Japanese Patent 4672214
PTL 10: Japanese Patent 3603785
PTL 11: JP-A 2005-97587
PTL 12: JP-A 2005-97588
PTL 13: JP-A 2006-131707
PTL 14: JP-A 2009-155655
PTL 15: JP-A 2009-155656
PTL 16: JP-T 2002-521534
PTL 17: JP-A 6-184214
PTL 18: JP-A 2008-223011
PTL 19: JP-T 2009-535444

Non-Patent Literature

NPL 1: K. Nozaki et al., J. Am. Chem. Soc., 2007, 129, 8948-8949.
NPL 2: R. Jordan et al., J. Am. Chem. Soc., 2007, 129, 8946-8947.
NPL 3: A. Sen et al., Organometallics, 2007, 26, 210-216.

SUMMARY OF INVENTION

Technical Problem

Considering the above-mentioned conventional methods, it is desired to propose a polar group-containing olefin copolymer that contains a carboxyl group or a derivative thereof of a dicarboxylic acid anhydride group, that exhibits excellent adhesion performance to different types of high-polar materials and that can be produced not according to any method involving problems intrinsic thereto for introducing a polar group into an olefin copolymer, such as a method of using a graft modification or high-pressure radical polymerization process or using a large amount of an organic aluminium, a method of copolymerization with masking the polar group of a polar group-containing monomer with an organic metal compound such as an organic aluminium or the like in polymerization, or a method of modifying the double bond part of an olefin copolymer having a double bond in the molecular chain thereof, as well as a resin composition and also an adhesive material, a laminate and other application products using the copolymer or the composition.

In consideration of various conventional problems described above as the background art, the subject matter of the present invention is to develop a polar group-containing olefin copolymer and a resin composition that can be produced not according to any conventional methods involving problems intrinsic thereto and that can exhibit excellent adhesion performance to different types of high-polar materials, and to provide an adhesive material, a laminate and various products (including molded articles and various members).

Solution to Problem

For solving the above-mentioned problems, the present inventors have variously investigated and circumstantiated the introduction method for a polar group, selection of a polar group and a polymerization catalyst, and further the relationship between the structure of a copolymer and the adhesion performance thereof in production of a polar group-containing olefin copolymer, for the purpose of producing the copolymer in a simple and efficient production method and for improving the adhesion performance of the copolymer with other different materials, and as a result, have succeeded in finding out a polar group-containing olefin copolymer excellent in adhesion performance to different types of materials, and have created the present invention.

Specifically, the polar group-containing olefin copolymer (A') of the first aspect of the present invention is a specific polar group-containing olefin copolymer produced through polymerization using a transition metal catalyst, of which the weight-average molecular weight (Mw) falls within a specific range, in which the polar group-containing monomer content falls within a specific range, and which exhibits especially excellent adhesiveness.

The multinary polar olefin copolymer (A") of the second aspect of the present invention is a multinary copolymer indispensably comprising a polar monomer component (Z1) having a norbornene skeleton and a carboxyl group or an acid anhydride group and having at least three types of monomer units.

Further, the third aspect of the present invention is a resin composition containing a specific amount of a polar group-containing olefin copolymer (A) and a specific amount of an olefin resin (B).

Concretely, the present invention is as follows.

<<First Aspect of Invention>>

<1> A polar group-containing olefin copolymer obtained through copolymerization of at least one nonpolar monomer selected from ethylene and α-olefins having from 3 to 20 carbon atoms, and at least one polar group-containing monomer containing a carboxyl group or a dicarboxylic acid anhydride group, in the presence of a transition metal catalyst, wherein the polar group-containing olefin copolymer is a random copolymer and satisfies the following requirements 1) and 2):
1) The amount of structural unit derived from the polar group-containing monomer in the polar group-containing olefin copolymer is from 0.001 to 10 mol %; and
2) The weight-average molecular weight (Mw) of the copolymer, as obtained through gel permeation chromatography (GPC), is from 45,000 to 1,000,000.

<2> The polar group-containing olefin copolymer according to the <1> above, wherein the amount of structural unit derived from the polar group-containing monomer contained inside the molecular chain is larger than the amount of structural unit derived from the polar group-containing monomer contained at the end of the molecular chain.

<3> The polar group-containing olefin copolymer according to the <1> or <2> above, wherein a ratio (Mw/Mn) of the weight-average molecular weight (Mw) to the number-average molecular weight (Mn), as obtained through gel permeation chromatography, falls within a range of from 1.5 to 3.5.

<4> The polar group-containing olefin copolymer according to any one of the <1> to <3> above, wherein a melting point, as represented by a temperature at a position of maximum peak in the absorption curve measured with a differential scanning calorimeter, is from 50° C. to 140° C.

<5> The polar group-containing olefin copolymer according to any one of <1> to <4> above, wherein the transition metal catalyst is a transition metal catalyst containing a chelating ligand and a metal of Groups 5 to 11.

<6> The polar group-containing olefin copolymer according to any one of <1> to <5> above, wherein the transition metal catalyst is a transition metal catalyst where a triaryl phosphine or triarylarsine compound is coordinated with a palladium or nickel metal.

<7> The polar group-containing olefin copolymer according to any one of <1> to <6> above, wherein the polar group-containing monomer contains a dicarboxylic acid anhydride group.

<<Second Aspect of Invention>>

<8> A multinary polar olefin copolymer comprising: at least one nonpolar monomer (X1) unit selected from ethylene and α-olefins having from 3 to 10 carbon atoms; at least one polar monomer (Z1) unit selected from compounds represented by the general formula (1); and optionally at least one polar monomer (Z2) unit selected from compounds represented by the general formula (2) (wherein the types of the monomer units used for X1, Z1 and Z2 are three or more).

[Chem. 1]

(1)

[Chem. 2]

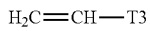
(2)

$H_2C=CH-T3$

[In the general formula (1), T1 and T2 each represent a carboxyl group, or T1 and T2 bond to each other to form a cyclic structure and represent an acid anhydride group. In the general formula (2), T3 represents a substituent selected from a group consisting of a hydrocarbon group substituted with a hydroxyl group and having from 1 to 10 carbon atoms, a hydrocarbon group substituted with an alkoxy group with from 1 to 10 carbon atoms and having from 2 to 20 carbon atoms, a hydrocarbon group substituted with an ester group with from 2 to 10 carbon atoms and having from 3 to 20 carbon atoms, a hydrocarbon group substituted with a silyl group with from 3 to 18 carbon atoms and having from 4 to 20 carbon atoms, a hydrocarbon group substituted with a halogen atom and having from 1 to 10 carbon atoms, an alkoxy group having from 1 to 10 carbon atoms, an aryloxy group having from 6 to 20 carbon atoms, a carboxyl group, an ester group having from 2 to 10 carbon atoms, an amino group, a substituted amino group having from 1 to 12 carbon atoms, a silyl group having from 3 to 18 carbon atoms, and a halogen.]

<9> The multinary polar olefin copolymer according to <8> above, wherein the total amount of the monomer units derived from the monomer Z1 and the monomer Z is from 0.001 to 10.000 mol %.

<10> The multinary polar olefin copolymer according to <8> or <9> above, which has a methyl branching degree, as calculated through $^{13}$C-NMR, of 5.0 or less, relative to 1,000 carbons in the multinary polar olefin copolymer.

<11> The multinary polar olefin copolymer according to any one of <8> to <10> above, wherein the monomer X1 is one of ethylene or α-olefin.

<12> The multinary polar olefin copolymer according to any one of <8> to <11> above, which comprises the monomer Z2 as an essential monomer unit, in which, in the general formula (2), T3 is an ester having from 2 to 10 carbon atoms.

<13> The multinary polar olefin copolymer according to any one of <8> to <12> above, wherein the molar ratio of the monomer Z2 to the monomer Z1 in the copolymer is from 0.001 to 10.000.

<14> The multinary polar olefin copolymer according to any one of <8> to <13> above, wherein the ratio of the weight-average molecular weight (Mw) to the number-average molecular weight (Mn), as obtained through gel permeation chromatography, falls within a range of from 1.5 to 3.5.

<15> The multinary polar olefin copolymer according to any one of <8> to <14> above, wherein a melting point, as represented by a temperature at a position of maximum peak in the absorption curve measured with a differential scanning calorimeter, is from 50° C. to 140° C.

<16> The multinary polar olefin copolymer according to any one of <8> to <15> above, wherein a transition metal catalyst is a transition metal catalyst containing a chelating ligand and a metal of Groups 5 to 11.

<17> The multinary polar olefin copolymer according to <16> above, wherein the transition metal catalyst is a transition metal catalyst where a triaryl phosphine or triarylarsine compound is coordinated with a palladium or nickel metal.

<18> The multinary polar olefin copolymer according to <17> above, wherein at least one of the triaryl phosphine or triarylarsine compound has a phenyl group substituted with a secondary or tertiary alkyl group.

<<Third Aspect of Invention>>

<19> An olefin resin composition (C) comprising: a polar group-containing olefin copolymer (A) obtained through copolymerization of at least one nonpolar monomer selected from ethylene and α-olefins having from 3 to 20 carbon atoms, and at least one polar group-containing monomer containing a carboxyl group or a dicarboxylic acid anhydride group, in the presence of a transition metal catalyst; and an olefin resin (B) other than the (A), wherein the amount of the olefin resin (B) is from 25 to 100,000 parts by weight relative to 100 parts by weight of the polar group-containing olefin copolymer (A).

<20> The olefin resin composition according to <19> above, wherein the polar group-containing olefin copolymer (A) is a random copolymer of an ethylene or an α-olefin having from 3 to 20 carbon atoms and a polar group-containing monomer containing a carboxyl group or a dicarboxylic acid anhydride group, and in the copolymer, the amount of structural unit derived from the polar group-containing monomer contained inside the molecular chain is larger than the amount of structural unit derived from the polar group-containing monomer contained at the end of the molecular chain.

<21> The olefin resin composition according to <19> or <20> above, wherein a ratio (Mw/Mn) of the weight-average molecular weight (Mw) to the number-average molecular weight (Mn) of the polar group-containing olefin copolymer (A), as obtained through gel permeation chromatography, falls within a range of from 1.5 to 3.5.

<22> The olefin resin composition according to any one of <19> to <21> above, wherein a melting point of the polar group-containing olefin copolymer (A), as represented by a temperature at a position of maximum peak in the absorption curve measured with a differential scanning calorimeter, falls within a range of from 50° C. to 140° C.

<23> The olefin resin composition according to any one of <19> to <22> above, wherein the polar group-containing olefin copolymer (A) is one produced through polymerization in the presence of a transition metal catalyst containing a chelating ligand and a metal of Groups 5 to 11.

<24> The olefin resin composition according to any one of <19> to <23> above, wherein the polar group-containing olefin copolymer (A) is one produced through polymerization in the presence of a transition metal catalyst where a triaryl phosphine or triarylarsine compound is coordinated with a palladium or nickel metal.

<25> The olefin resin composition according to any one of <19> to <24> above, wherein the olefin resin (B) is one obtained through polymerization of at least one monomer selected from ethylene and an α-olefin having from 3 to 20 carbon atoms.

<26> The olefin resin composition according to any one of <19> to <25> above, wherein the polar group-containing monomer contains a dicarboxylic acid anhydride group.

Further, the present invention relates to an adhesive material, a laminate and other application products, containing at least one of the above-mentioned polar group-containing olefin copolymer (first aspect of the invention), the multinary polar olefin copolymer (second aspect of the invention) and the olefin resin composition (third aspect of the invention). Concretely, the present invention is as follows.

<27> An adhesive material comprising the polar group-containing olefin copolymer according to any one of <1> to <7> above, the multinary polar olefin copolymer according to any one of <8> to <18> above, or the olefin resin composition according to any one of <19> to <26> above.

<28> A laminate comprising: a layer that contains the polar group-containing olefin copolymer according to any one of <1> to <7> above, the multinary polar olefin copolymer according to any one of <8> to <18> above, or the olefin resin composition according to any one of <19> to <26> above; and a substrate layer.

<29> The laminate according to <28> above, wherein the substrate layer contains at least one selected from an olefin resin, a high-polar thermoplastic resin, a metal, a vapor-deposited film of an inorganic oxide, a paper, a cellophane, a woven fabric and a nonwoven fabric.

<30> A laminate produced through a lamination using a laminating material that contains the polar group-containing olefin copolymer according to any one of <1> to <7> above, the multinary polar olefin copolymer according to any one of <8> to <18> above, or the olefin resin composition according to any one of <19> to <26> above, with one or more substrate layers.

<31> A multilayer coextrusion-molded product, comprising: a layer that contains the polar group-containing olefin copolymer according to any one of <1> to <7> above, the multinary polar olefin copolymer according to any one of <8> to <18> above, or the olefin resin composition according to any one of <19> to <26> above; and a substrate layer.

<32> The multilayer coextrusion-molded product according to <31> above, wherein the multilayer coextrusion-molded product is a multilayer film, a multilayer blow-molded product, a multilayer tubular-molded product, or a multilayer sheet.

<33> An injection-molded product comprising the polar group-containing olefin copolymer according to any one of <1> to <7> above, the multinary polar olefin copolymer according to any one of <8> to <18> above, or the olefin resin composition according to any one of <19> to <26> above.

<34> A complexed injection-molded product obtained by injection-molding and complexing a substrate, and a member that contains the polar group-containing olefin copolymer according to any one of <1> to <7> above, the multinary polar olefin copolymer according to any one of <8> to <18> above, or the olefin resin composition according to any one of <19> to <26> above.

<35> A polar group-containing olefin copolymer-coated metal member, wherein a metal is coated with the polar group-containing olefin copolymer according to any one of <1> to <7> above, the multinary polar olefin copolymer according to any one of <8> to <18> above, or the olefin resin composition according to any one of <19> to <26> above.

Advantageous Effects of Invention

The polar group-containing olefin copolymer (A') of the first aspect of the present invention has a specific molecular structure and specific resin properties, the multinary polar olefin copolymer (A") of the second aspect of the present invention indispensably comprises three or more types of copolymers with indispensably a specific comonomer component (Z1), and the olefin resin composition of the third aspect of the present invention contains a polar group-containing olefin copolymer (A) along with a specific amount of any other olefin resin (B) added thereto; and these express high adhesiveness to any other substrate, especially to high-polar EVOH resin or amide resin, and therefore have made it possible to produce industrially useful laminates. Such remarkable effects are verified by the data in Examples of the present invention and by comparison between Examples and Comparative Examples.

In addition, the polar group-containing olefin copolymer (A') of the present invention, the multinary polar olefin copolymer (A") and the resin composition comprising (A) and (B) each in a specific amount have not only excellent adhesiveness but also excellent mechanical and thermal properties, and are applicable to useful multilayer molded articles, and these can be molded into multilayer films, multilayer blow-molded bottles and others through extrusion molding, blow molding or the like, and can be used in wide-range applications.

DESCRIPTION OF EMBODIMENTS

Figure 1A:
FIG. 1A is a conceptual view of the molecular structure of an olefin copolymer produced through polymerization of a high-pressure radical polymerization process.
Figure 1B:
FIG. 1B is a conceptual view of the molecular structure of an olefin copolymer not having a long-chain branch and produced through polymerization using a metal catalyst.
Figure 1C:
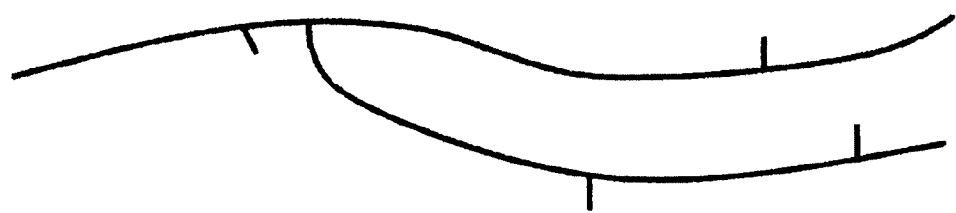
FIG. 1C is a conceptual view of the molecular structure of an olefin copolymer a small amount of a long-chain branch and produced through polymerization using a metal catalyst.

In the following, a polar group-containing olefin copolymer of the present invention and an adhesive material and a laminate using the copolymer are described concretely and in detail for the respective items thereof.

[1] Regarding Polar Group-Containing Olefin Copolymer (A')
(1) Polar group-Containing Olefin Copolymer (A')

The polar group-containing olefin copolymer of the present invention is a copolymer of at least one nonpolar monomer selected from ethylene and α-olefins having from 3 to 20 carbon atoms, and at least one polar group-containing monomer containing a carboxyl group or a dicarboxylic acid anhydride group.

Polar group-containing olefin copolymers are already known in a graft polymerization or high-pressure radical polymerization method or in any other polymerization methods mentioned above. However, the present invention satisfies the requirement that the copolymer is a random copolymer produced through polymerization in the presence of a transition metal, differing from such known polar group-containing olefin copolymers, and therefore the copolymer of the present invention differs from known graft polymers and radical polymers in point of the molecular structure of the polymer. In addition, the polar group-containing olefin copolymer (A') of the first aspect of the present invention satisfies the structural unit requirement 1) and the weight-average molecular weight requirement 2) to be mentioned below as the range within which the polymer has the special adhesive effect by itself, and therefore significantly differs from any known copolymers.

(2) Nonpolar Monomer

The nonpolar monomer for use for the copolymer of the present invention is ethylene and/or an α-olefin, and the α-olefin preferably has from 3 to 20 carbon atoms, more preferably from 3 to 12 carbon atoms, concretely including propylene, butene-1, pentene-1, hexene-1, 4-methyl-1-pentene, octene-1, dodecene-1, etc. Of ethylene and α-olefins having from 3 to 20 carbon atoms, especially preferred is ethylene.

It is desirable that the structural unit amount derived from these ethylene and α-olefins is selected within a range of generally from 90 to 99.999 mol %, preferably from 95 to 99.99 mol %.

One alone or two or more different types of ethylene and α-olefins having from 3 to 20 carbon atoms may be used here either singly or as combined.

The combination of two monomers includes, for example, ethylene-propylene, ethylene-1-butene, ethylene-1-hexene, ethylene-1-octene, propylene-1-butene, propylene-1-hexene, propylene-1-octene, etc.

The combination of three monomers includes ethylene-propylene-1-butene, ethylene-propylene-1-hexene, ethylene-propylene-1-octene, propylene-1-butene-hexene, propylene-1-butene-1-octene, etc.

(3) Polar Group-Containing Monomer

The polar group-containing monomer to be subjected to polymerization to give the polar group-containing olefin copolymer of the present invention must contain a carboxyl group or a dicarboxylic acid anhydride group. The olefin copolymer having a carboxyl group or a dicarboxylic acid anhydride group can be laminated and adhered to substrates of high-polymer thermoplastic resins such as polyamide resins, polyester resins, saponified ethylene/vinyl acetate copolymer resins (EVOH) or the like, and metal materials such as aluminium, steel or the like.

It is more desirable that the polar group-containing monomer in the present invention has a cyclic skeleton in the monomer structure and further has a double bond in the cyclic structure, and more preferably has a norbornene structure, as enabling high-activity copolymerization More usefully, the functional group contained in the polar group-containing monomer is a dicarboxylic acid anhydride, from the viewpoint of the adhesiveness of the copolymer to high-polar different types of materials.

The polar group-containing monomer in the present invention includes unsaturated carboxylic acids such as acrylic acid, methacrylic acid, maleic acid, fumaric acid, tetrahydrophthalic acid, itaconic acid, citraconic acid, crotonic acid, isocrotonic acid, norbornenedicarboxylic acid, bicyclo[2,2,1]hept-2-ene-5,6-dicarboxylic acid, etc.; unsaturated carboxylic acid anhydrides such as maleic anhydride, itaconic anhydride, citraconic anhydride, tetrahydrophthalic anhydride, 5-norbornene-2,3-dicarboxylic anhydride, 3,6-epoxy-1,2,3,6-tetrahydrophthalic anhydride, tetracyclo[6.2.1.1$^{3,6}$.0$^{2,7}$]dodec-9-ene-4,5-dicarboxylic anhydride, 2,7-octadien-1-yl-succinic anhydride, etc. One alone or two or more such polar group-containing monomers may be used here either singly or as combined.

Of those, especially preferred are 2,7-octadien-1-yl-succinic anhydride, 5-norbornene-2,3-dicarboxylic anhydride, 3,6-epoxy-1,2,3,6-tetrahydrophthalic anhydride, etc.

[Chem. 3]

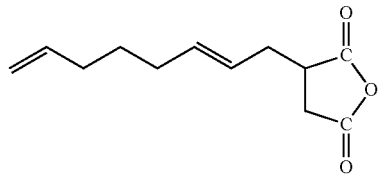

2,7-Octadien-1-yl-succinic anhydride

[Chem. 4]

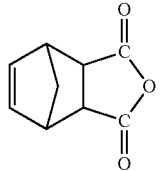

5-norbornene-2,3-dicarboxylic anhydride

[Chem. 5]

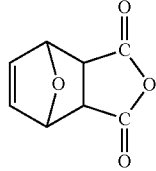

3,6-Epoxy-1,2,3,6-tetrahydrophthalic anhydride

In the polar group-containing olefin copolymer using an unsaturated dicarboxylic acid anhydride-containing monomer as the polar group-containing monomer, a part of the dicarboxylic acid anhydride group contained may react with water or water vapor existing in air or the like for ring-opening to give a carboxylic acid group. Within a range not overstepping the scope and the spirit of the present invention, the dicarboxylic acid anhydride group in the copolymer may be ring-opened.

(4) Structural Unit of Polar Group-Containing Olefin Copolymer

The structural unit of the polar group-containing olefin copolymer of the present invention and the structural unit amount in the copolymer are described.

The structure resulting from one molecule of ethylene or the α-olefin having from 3 to 20 carbon atoms as well as from the polar group-containing monomer is defined as one structural unit in the polar group-containing olefin copolymer. Each structural unit in the polar group-containing olefin copolymer, as expressed in terms of mol %, is the structural unit amount. This is described with reference to an example of the molecular structure of the polar group-containing olefin copolymer. The structures resulting from the polar group-containing monomers A1, A2 and A3 to be mentioned below each are the structural unit, and the individual abundance ratio is the structural unit amount thereof.

(5) Structural Unit Amount of Polar Group-Containing Monomer

It is desirable that the structural unit amount of the polar group-containing monomer is generally selected within a range of from 10 to 0.001 mol %, preferably from 5 to 0.01 mol %. When the structural unit amount derived from the polar group-containing monomer is smaller than the range, then the adhesiveness of the copolymer to high-polar different types of materials would not be sufficient; and when more than the range, then the copolymer could not have sufficient mechanical properties.

The polar group-containing monomer structural unit amount at the end of the molecular chain and inside the molecular chain of the polar group-containing olefin copolymer of the present invention, and the total structural unit amount of the polar group in the copolymer may be determined through $^{13}$C-NMR spectrometry. $^{13}$C-NMR spectrometry of the copolymer is as follows:

100 mg of the polar group-containing olefin copolymer (A) is put into a 10-mmϕ NMR sample tube along with 2.4 ml of o-dichlorobenzene/bromobenzene deuteride ($C_6D_5Br$) =4/1 (by volume) and hexamethyldisiloxane as a standard substance of chemical shift therein, and dissolved, and using an NMR apparatus of Bruker BioSpin's AV400M Model equipped with a cryoprobe, this is analyzed according to a proton complete decoupling method in which the sample temperature is 130° C., the pulse angle is 90°, the pulse interval is 20 seconds and the number of scans is 500 times or more. For the chemical shift, the peak of the methyl carbon of hexamethyldisiloxane is set as 1.98 ppm, and the chemical shift of the peaks of the other carbons are based on the standard.

In case where the polar group-containing monomer species is 5-norbornene-2,3-dicarboxylic anhydride and when the polar group-containing monomer is introduced into the end of the molecular chain and when the structure of A1 mentioned below (hereinafter referred to as structure A1) is introduced inside the main chain of the molecular chain, then the copolymer has a structure of A2 (hereinafter referred to as structure A2). In the $^{13}$C-NMR spectrum of the copolymer, a peak for the methylene carbon $A1_\alpha$ adjacent to the double bond of the structure A1 is detected at around 33.6 ppm, and a peak for the methylene carbon $A2_{br}$ of the structure A2 is at around 42.1 ppm. In addition, a peak for the main chain methylene carbon is detected at around 29.9 ppm. For example, when the integral intensity of the peak for the carbon $A1_\alpha$ at around 33.6 ppm is expressed as $I_{33.6}$ or the like, then the content of the structures A1 and A2 is obtained according to the following formula-1, 2.

Content of structure $A1$ (mol %)=$2\times I_{33.6}\times 100/(2\times I_{33.6}+I_{42.1}+I_{29.9})$   Formula-1

Content of structure $A1$ (mol %)=$I_{42.1}\times 100/(2\times I_{33.6}+I_{42.1}+I_{29.9})$   Formula-2

The total structural unit amount of the polar group is obtained as the sum of the structure A1 content and the structure A2 content obtained according to the above formulae-1 and 2.

[Chem. 6]

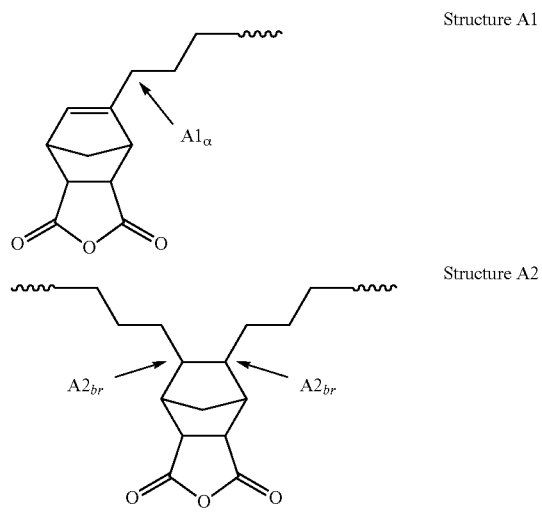

Structure A1

Structure A2

In case where the polar group-containing monomer species is (2,7-octadien-1-yl)succinic anhydride and when the polar group-containing monomer is introduced inside the main chain of the molecular chain, the copolymer has a structure of A3 (hereinafter referred to as structure A3). In this case, a peak for the methine carbon $A3_{br}$ of the structure A3 bonding to the main chain is detected at around 38.0 ppm. In any case where the polar group-containing monomer is introduced inside the main chain or is introduced into the end of the molecular chain, a peak for the methine carbon $A3_{CH}$ of the succinic acid anhydride group is detected at around 41.0 ppm. When the integral intensity of the peak for the carbon $A3_{br}$ at around 38.0 ppm is expressed as $I_{38.0}$, and the integral intensity of the peak for the carbon $A3_{CH}$ at around 41.0 ppm is as $I_{41.0}$ or the like, then the total structural unit amount of the polar group and the content of the structure A3 are obtained according to the following formula-3 and formula-4.

Total structural unit amount of polar group (mol %)=$2\times I_{41.0}\times 100/(2\times I_{41.0}+I_{29.9})$   Formula-3

Content of structure $A3$ (mol %)=$2\times I_{38.0}\times 100/(2\times I_{41.0}+I_{29.9})$   Formula-4

[Chem. 7]

$A3_{br}$

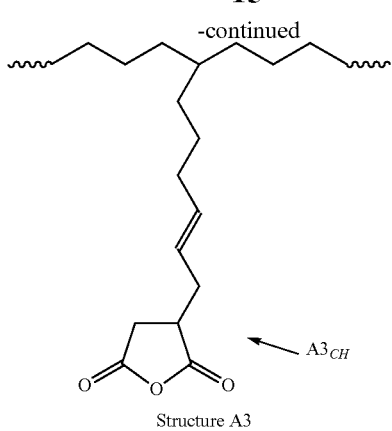

Structure A3

In the polar group-containing olefin copolymer of the present invention, it is indispensable that the structural unit amount derived from the polar group-containing monomer contained inside the molecular chain is larger than the structural unit amount derived from the polar group-containing monomer contained at the end of the molecular chain, in order to introduce a sufficient amount of the polar group into the polar group-containing olefin copolymer, not lowering the molecular weight of the copolymer. In case where the structural unit amount derived from the polar group-containing monomer contained inside the molecular chain is smaller than the structural unit amount derived from the polar group-containing monomer contained at the end of the molecular chain, then the polar group mostly exists at the end of the molecular chain. With the increase in the molecular weight in the case, the polar group content in the molecular chain relatively decreases so that the copolymer could not exhibit sufficient adhesiveness. In addition, for increasing the polar group content in the molecular chain, it is necessary to reduce the molecular weight; however, the copolymer must have a weight-average molecular weight (Mw) in a specific range in order to be sufficiently adhesive to high-polar different types of materials, as described below, or that is, it is impossible to satisfy both a sufficient high molecular weight and a sufficient polar group content.

Further, it is desirable that the structural unit amount derived from the polar group-containing monomer contained inside the molecular chain of the copolymer is selected within a range of from 10 to 0.001 mol %, preferably from 5 to 0.01 mol %, more preferably from 2 to 0.03 mol %, and that the structural unit indispensably exists in the polar group-containing olefin copolymer of the present invention.

On the other hand, the structural unit amount derived from the polar group-containing monomer contained at the end of the molecular chain may be selected from a range of 10 mol % or less, preferably 5 mol % or less, more preferably 0.1 mol % or less, and the structural unit amount in the copolymer may be only a slight amount of 0.001 mol % or so or even 0 mol %.

Preferably, the polar group-containing olefin copolymer of the present invention is a random copolymer of ethylene or an α-olefin having from 3 to 20 carbon atoms and a polar group-containing monomer.

An example of the molecular structure of the polar group-containing olefin copolymer of the present invention is shown by the following formula (i). The random copolymer is a copolymer of which the molecular structure is represented by an example of the formula (i) wherein the probability of finding the structural unit A and the structural unit B at any position of the molecular chain is unrelated to the structural unit adjacent thereto. The end of the molecular chain of the polar group-containing olefin copolymer may be any of ethylene or an α-olefin having from 3 to 20 carbon atoms, or may be a polar group-containing monomer.

As described below, in the molecular structure (example) of the polar group-containing olefin copolymer of the present invention, the monomers including ethylene or an α-olefin having from 3 to 20 carbon atoms and a monomer containing a carboxyl group or a derivative thereof form a random copolymer.

[Chem. 8]

-ABAAAABBAABAAA-   (i)

In the formula (i), A is ethylene or an α-olefin having from 3 to 20 carbon atoms, and B is a monomer containing a carboxyl group or a derivative thereof.

For reference, a molecular structure (example) of an olefin copolymer in which the polar group is introduced through graft modification is shown by the following formula (ii). In this, a part of the olefin copolymer copolymerized with ethylene or an α-olefin having from 3 to 20 carbon atoms is graft-modified a monomer containing a carboxyl group or a derivative thereof.

[Chem. 9]

$$-\underset{B}{\underset{|}{A}}AAAAAAAAAAAAA\underset{B}{\underset{|}{A}}-\quad\text{(ii)}$$

In the formula (ii), A is ethylene or an α-olefin having from 3 to 20 carbon atoms, and B is a monomer containing a carboxyl group or a derivative thereof.

(6) Weight-Average Molecular Weight (Mw) of Polar Group-Containing Olefin Copolymer It is desirable that the weight-average molecular weight (Mw) of the polar group-containing olefin copolymer is within a range of generally from 45,000 to 1,000,000, preferably from 45,500 to 500,000, more preferably from 46,000 to 300,000.

When Mw is less than 45,000, then the adhesiveness of the copolymer to high-polar different types of materials is not sufficient; but when more than 1,000,000, the melt viscosity of the copolymer is too high and it would be difficult to mold the copolymer.

The reason why the polar group-containing olefin copolymer of which the weight-average molecular weight (Mw) is less than 45,000 is not sufficiently adhesive to high-polar different types of materials is described below.

The adhesive performance of the olefin copolymer to high-polar different types of materials is evaluated based on the value to be measured in a peeling test as exemplified by JIS K6845-1 to 4 "Adhesive Material-Peeling Adhesive strength Test Method".

The adhesiveness evaluation results shown in Examples are referred to. It is known that, when the weight-average molecular weight (Mw) of the polar group-containing olefin copolymer is larger than 45,000, then the measured adhesive strength increases. Probably, this would be because the adhesion performance of the polar group-containing olefin copolymer may be correlated with the cohesive force of the resin. It may be presumed that, when the molecular chain of the polar group-containing olefin copolymer is longer than a predetermined level, then the copolymer can have a cohesive force sufficient for expressing adhesion performance and, as a result, when the weight-average molecular weight (Mw) of the copolymer is larger than 45,000, then the copolymer can exhibit sufficient adhesiveness.

It is desirable that the ratio (Mw/Mn) of the weight-average molecular weight (Mw) to the number-average molecular weight (Mn) of the polar group-containing olefin copolymer is within a range of generally from 1.5 to 3.5, preferably from 1.6 to 3.3, more preferably from 1.7 to 3.0. When Mw/Mn is less than 1.5, then the workability of the copolymer such as typically the moldability thereof is insufficient; but when more than 3.5, then the adhesive strength of the copolymer is poor. (Mw/Mn) may be expressed as a molecular weight distribution parameter.

In the present invention, the weight-average molecular weight (Mw) may be determined through gel permeation chromatography (GPC). For the molecular weight distribution parameter (Mw/Mn), the number-average molecular weight (Mn) is additionally determined through gel permeation chromatography, and the ratio of Mn/Mn is calculated from the found data.

The method of GPC in the present invention is as follows. Using Waters' 150C Model, the copolymer sample is analyzed under the condition mentioned below to determine the weight-average molecular weight (Mw) and the number-average molecular weight (Mn) thereof.

Column: Showdex HT-G and Showdex HT-806M×2
Solvent: orthodichlorobenzene (ODCB)
Temperature: 140° C.
Flow rate: 1.0 ml/min The columns were calibrated with Showa Denko's monodispersed polystyrene (0.2 mg/ml solutions of S-7300, S-3900, S-1950, S-1460, S-1010, S-565, S-152, S-66.0, S-28.5, and S-5.05).

N-eicosane and n-tetracontane were used for the measurement, and the elution time and the logarithmic value of the molecular weight were approximated by a quartic equation. For conversion into the molecular weight of polystyrene and polyethylene, used is the following equation.

$$M_{PE}=0.468 \times M_{PS}$$

(7) Melting Point of Polar Group-Containing Olefin Copolymer

The melting point of the polar group-containing olefin copolymer of the present invention is shown by the peak temperature of the endothermic curve of the copolymer measured with a differential scanning calorimeter.

Reference is made to polyethylene, and the melting point thereof is preferably from 50° C. to 140° C., more preferably from 60° C. to 138° C., most preferably from 70° C. to 135° C.

When the melting point is lower than the range, then the heat resistance of the polymer is not sufficient; but when higher than the range, the adhesiveness thereof is poor.

[II] Regarding Multinary Polar Olefin Copolymer (A")

The multinary polar olefin copolymer (A") of the second aspect of the present invention is a multinary copolymer indispensably containing a polar monomer component (Z1) that has a norbornene skeleton and a carboxyl group or an acid anhydride group and having three or more types of monomer units, and is concretely as described below.

A multinary polar olefin copolymer containing at least one nonpolar monomer (X1) unit selected from ethylene and α-olefins having from 3 to 10 carbon atoms, at least one polar monomer (Z1) unit selected from compounds represented by the general formula (1), and optionally at least one polar monomer (Z2) unit selected from compounds represented by the general formula (2) (wherein the types of the monomer units used for X1, Z1 and Z2 are three or more).

[Chem. 10]

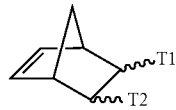
(1)

[Chem. 11]

$$H_2C=CH-T3 \quad (2)$$

(1) Nonpolar Monomer (X1) Selected from Ethylene and α-Olefins

The nonpolar monomer (X1) used for the multinary polar olefin copolymer (A") is the same as ethylene or α-olefin to be used for the above-mentioned polar group-containing olefin copolymers (A) and (A'), (X1) is preferably one type of ethylene or α-olefin.

(2) Monomer Z1

The monomer Z1 for use for the multinary polar olefin copolymer (A") is a polar comonomer selected from the compounds represented by the general formula (1).

[Chem. 12]

(1)

In the general formula (1), T1 and T2 each represent a carboxyl group, or T1 and T2 bond to each other to form a cyclic structure, and represent an acid anhydride group.

As Z1, concretely, there is preferably mentioned norbornene-2,3-dicarboxylic acid or norbornene-2,3-dicarboxylic anhydride.

In the copolymer using an unsaturated dicarboxylic acid anhydride as the monomer, a part of the dicarboxylic acid anhydride group contained may react with water vapor existing in air for ring-opening to give a carboxylic acid group. Within a range not overstepping the scope and the spirit of the present invention, the dicarboxylic acid anhydride group in the copolymer may be ring-opened. One alone or two or more types of groups may be used for Z1.

(3) Monomer Z2

The optional component, monomer Z2 is a polar copolymer selected from the compounds represented by the general formula (2). For Z2, multiple monomer components may be used.

[Chem. 13]

$$H_2C=CH-T3 \quad (2)$$

In the general formula (2), T3 represents a substituent selected from a group consisting of a hydrocarbon group substituted with a hydroxyl group and having from 1 to 10 carbon atoms, a hydrocarbon group substituted with an alkoxy group with from 1 to 10 carbon atoms and having from 2 to 20 carbon atoms, a hydrocarbon group substituted with an ester group with from 2 to 10 carbon atoms and having from 3 to 20 carbon atoms, a hydrocarbon group substituted with a silyl group with from 3 to 18 carbon atoms and having from 4 to 20 carbon atoms, a hydrocarbon group substituted with a halogen atom and having from 1 to 10 carbon atoms, an alkoxy group having from 1 to 10 carbon atoms, an aryloxy group having from 6 to 20 carbon atoms, a carboxyl group, an ester group having from 2 to 10 carbon atoms, an amino group, a substituted amino group having from 1 to 12 carbon atoms, a silyl group having from 3 to 18 carbon atoms, and a halogen.

(4) Concrete Description of Each Monomer

T1, T2 and T3 in Z1 and Z2 are described in detail hereinunder.

As T3 that is a hydrocarbon group substituted with a hydroxyl group and having from 1 to 10 carbon atoms, there are preferably mentioned hydroxyl-substituted derivatives of an alkyl group having from 1 to 10 carbon atoms, a cycloalkyl group having from 3 to 10 carbon atoms, an alkenyl group having from 2 to 10 carbon atoms, or an aryl group having from 6 to 20 carbon atoms.

Preferred examples include a hydroxymethyl group, a 1-hydroxyethyl group, a 2-hydroxyethyl group, a 1-hydroxy-n-propyl group, a 2-hydroxy-n-propyl group, a 3-hydroxy-n-propyl group, a 1-hydroxy-isopropyl group, a 2-hydroxy-isopropyl group, a 2,2'-dihydroxy-isopropyl group, a 1-hydroxy-n-butyl group, a 2-hydroxy-n-butyl group, a 3-hydroxy-n-butyl group, a 4-hydroxy-n-butyl group, a 1-hydroxy-1-methylpropyl group, a 1-hydroxy-2-methylpropyl group, a 2-hydroxy-1-methylpropyl group, a 2-hydroxy-2-methylpropyl group, a 3-hydroxy-1-methylpropyl group, a 3-hydroxy-2-methylpropyl group, a 3-hydroxy-3-methylpropyl group. Of those, preferred are a hydroxymethyl group, a 1-hydroxyethyl group and 2-hydroxyethyl group; and more preferred are a hydroxymethyl group and a 1-hydroxyethyl group.

As T3 that is a hydrocarbon group substituted with an alkoxy group with from 1 to 10 carbon atoms and having from 2 to 20 carbon atoms, there are preferably mentioned derivatives of an alkyl group, a cycloalkyl group, an alkenyl group or an aryl group substituted with a methoxy group, an ethoxy group, an n-propoxy group, an isopropoxy group, an n-butoxy group or a t-butoxy group.

More preferred is a hydrocarbon group having from 1 to 6 carbon atoms and substituted with a methoxy group or an ethoxy group. Concretely, there are mentioned a 1-(methoxymethyl)ethyl group, a 1-(ethoxymethyl)ethyl group, a 1-(phenoxymethyl)ethyl group, a 1-(methoxyethyl)ethyl group, a 1-(ethoxyethyl)ethyl group, a di(methoxymethyl)methyl group, a di(ethoxymethyl)methyl group, a di(phenoxymethyl)methyl group.

Especially preferred are a 1-(methoxymethyl)ethyl group, a 1-(ethoxymethyl)ethyl group.

As T3 that is a hydrocarbon group substituted with an ester group with from 2 to 10 carbon atoms and having from 3 to 20 carbon atoms, there are preferably mentioned derivatives of an alkyl group, a cycloalkyl group, an alkenyl group or an aryl group substituted with a methoxycarbonyl group, an ethoxycarbonyl group, an isopropoxycarbonyl group, a 1-propoxycarbonyl group, a 1-butoxycarbonyl group, a t-butoxycarbonyl group, or a phenoxycarbonyl group. More preferred is a hydrocarbon group having from 1 to 5 carbon atoms and substituted with a methoxycarbonyl group or an ethoxycarbonyl group. There are concretely mentioned a 1-(methoxycarbonyl)methyl group, a 2-(methoxycarbonyl)ethyl group, a 1-(ethoxycarbonyl)methyl group, a 2-(ethoxycarbonyl)ethyl group. More preferred are a 1-(methoxycarbonyl)methyl group and a 1-(ethoxycarbonyl)methyl group.

Preferred examples of T3 that is a hydrocarbon group substituted with a silyl group with from 3 to 18 carbon atoms and having from 4 to 20 carbon atoms include a (trimethyl)silyl group, a ((dimethyl)(phenyl)silyl)methyl group, a ((diphenyl)(methyl)silyl)methyl group, a (triphenylsilyl)methyl group, a bis(trimethylsilyl)methyl group. Of those, more preferred substituents are a (trimethylsilyl)methyl group and a bis(trimethylsilyl)methyl group.

T3 that is a hydrocarbon group substituted with a halogen atom and having from 1 to 10 carbon atoms is preferably a substituent substituted with a fluorine atom, a chlorine atom or a bromine atom and having from 1 to 6 carbon atoms. As preferred examples, there are concretely mentioned a monochloromethyl group, a dichloromethyl group, a trifluoromethyl group, a pentafluorophenyl group. Of those, more preferred substituents are a monochloromethyl group and a dichloromethyl group.

T3 that is an alkoxy group having from 1 to 10 carbon atoms is preferably an alkoxy group having from 1 to 6 carbon atoms, and preferred examples thereof are a methoxy group, an ethoxy group, an n-propoxy group, an isopropoxy group, an n-butoxy group, and a t-butoxy group. Of those, more preferred substituents are a methoxy group, an ethoxy group, and an isopropoxy group; and even more preferred is a methoxy group.

T3 that is an aryloxy group having from 6 to 20 carbon atoms is preferably an aryloxy group having from 6 to 12 carbon atoms, and preferred examples thereof are a phenoxy group, a 4-methylphenoxy group, a 4-methoxyphenoxy group, a 2,6-dimethylphenoxy group, and a 2,6-di-butylphenoxy group. Of those, more preferred substituents are a phenoxy group and a 2,6-dimethylphenoxy group; and even more preferred is a phenoxy group.

T3 that is an ester group having from 2 to 10 carbon atoms is preferably an ester group having from 2 to 8 carbon atoms, and preferred examples thereof are a methoxycarbonyl group, an ethoxycarbonyl group, an n-propoxycarbonyl group, an isopropoxycarbonyl group, an n-butoxycarbonyl group, a t-butoxycarbonyl group, a (4-hydroxybutyl)carbonyl group, a (4-glycidylbutyl)carbonyl group, and a phenoxycarbonyl group. Of those, more preferred substituents are a methoxycarbonyl group, an ethoxycarbonyl group, a (4-hydroxybutyl)carbonyl group, a (4-glycidylbutyl)carbonyl group. Even more preferred are a methoxycarbonyl group and a (4-glycidylbutyl)carbonyl group.

Preferred examples of T3 that is a substituted amino group having from 1 to 12 carbon atoms include a monomethylamino group, a dimethylamino group, a monoethylamino group, a diethylamino group, a monoisopropylamino group, a diisopropylamino group, a monophenylamino group, a diphenylamino group, a bis(trimethylsilyl)amino group, a morpholinyl group. Of those, more preferred substituents are a diphenylamino group and a bis(trimethylsilyl)amino group.

Preferred examples of T3 that is a silyl group having from 3 to 18 carbon atoms include a trimethylsilyl group, a (dimethyl)(phenyl)silyl group, a (diphenyl)(methyl)silyl group, a triphenylsilyl group. Of those, a trimethylsilyl group is a more preferred substituent.

T3 that is a halogen atom is preferably a fluorine atom, a chlorine atom or a bromine atom. A chlorine atom is a more preferred substituent.

(5) Type of Multinary Polar Olefin Copolymer (A")

The multinary polar olefin copolymer (A") of the present invention is a copolymer containing three or more types of monomer units selected from X1, Z1 and optionally Z2. Concretely, there are mentioned an ethylene/propylene/norbornene-2,3-dicarboxylic acid anhydride, an ethylene/1-butene/norbornene-2,3-dicarboxylic acid anhydride, an ethylene/1-pentene/norbornene-2,3-dicarboxylic acid anhydride, an ethylene/1-hexene/norbornene-2,3-dicarboxylic acid anhydride, an ethylene/1-octene/norbornene-2,3-dicarboxylic acid anhydride, an ethylene/1-decene/norbornene-2,3-dicarboxylic acid anhydride, an ethylene/3-methyl-1-butene/norbornene-2,3-dicarboxylic acid anhydride, an ethylene/4-methyl-1-pentene/norbornene-2,3-dicarboxylic acid anhydride, an ethylene/methyl acrylate/norbornene-2,3-dicarboxylic acid anhydride, an ethylene/ethyl acrylate/norbornene-2,3-dicarboxylic acid anhydride, an ethylene/n-butyl acrylate/norbornene-2,3-dicarboxylic acid anhydride, an ethylene/isobutyl acrylate/norbornene-2,3-dicarboxylic acid anhydride, an ethylene/t-butyl acrylate/norbornene-2,3-dicarboxylic acid anhydride, an ethylene/glycidyl acrylate/norbornene-2,3-dicarboxylic acid anhydride, an ethylene/(4-glycidyloxybutyl) acrylate/norbornene-2,3-dicarboxylic acid anhydride, an ethylene/hydroxyethyl acrylate/norbornene-2,3-dicarboxylic acid anhydride, etc.

Further mentioned are an ethylene/propylene/norbornene-2,3-dicarboxylic acid, an ethylene/1-butene/norbornene-2,3-dicarboxylic acid, an ethylene/1-pentene/norbornene-2,3-dicarboxylic acid, an ethylene/1-hexene/norbornene-2,3-dicarboxylic acid, an ethylene/1-octene/norbornene-2,3-dicarboxylic acid, an ethylene/1-decene/norbornene-2,3-dicarboxylic acid, an ethylene/3-methyl-1-butene/norbornene-2,3-dicarboxylic acid, an ethylene/4-methyl-1-pentene/norbornene-2,3-dicarboxylic acid, an ethylene/methyl acrylate/norbornene-2,3-dicarboxylic acid, an ethylene/ethyl acrylate/norbornene-2,3-dicarboxylic acid, an ethylene/n-butyl acrylate/norbornene-2,3-dicarboxylic acid, an ethylene/isobutyl acrylate/norbornene-2,3-dicarboxylic acid, an ethylene/t-butyl acrylate/norbornene-2,3-dicarboxylic acid, an ethylene/glycidyl acrylate/norbornene-2,3-dicarboxylic acid, an ethylene/(4-glycidyloxybutyl) acrylate/norbornene-2,3-dicarboxylic acid, an ethylene/hydroxyethyl acrylate/norbornene-2,3-dicarboxylic acid, etc.

As preferred examples, there are mentioned an ethylene/1-hexene/norbornene-2,3-dicarboxylic acid anhydride, an ethylene/methyl acrylate/norbornene-2,3-dicarboxylic acid anhydride, an ethylene/ethyl acrylate/norbornene-2,3-dicarboxylic acid anhydride, an ethylene/glycidyl acrylate/norbornene-2,3-dicarboxylic acid anhydride, an ethylene/(4-glycidyloxybutyl) acrylate/norbornene-2,3-dicarboxylic acid anhydride, etc.

(6) Monomer Ratio

In the multinary polar olefin copolymer (A'') of the present invention, the total amount of the structural units derived from the monomers Z1 and Z2 is preferably from 0.001 to 10.000 mol %. Of the range, more preferably, the total amount is selected within a range of from 0.010 to 5.000 mol %.

The structural unit amount may be controlled by selecting the transition metal catalyst and by changing the monomer amount to be added in polymerization, and the pressure and the temperature during polymerization.

In the multinary polar olefin copolymer (A'') of the present invention, the molar ratio of the monomer Z1 and the monomer Z2 is preferably within a range of from 0.001 to 10.000. Of the range, more preferred is a range of from 0.001 to 1.000, and even more preferred is from 0.001 to 0.500.

When the molar ratio falls within the range, then the effect of the monomer Z1 is strong and the copolymer can have excellent adhesive strength.

The molar ratio of the monomers Z1 and Z2 may be controlled by changing the blend ratio of the monomers Z1 and Z2 to be added during polymerization and by selecting the transition metal catalyst.

(7) Physical Properties

Of the multinary olefin copolymer (A'') of the present invention, preferably, the methyl branching degree, as calculated through $^{13}$C-NMR, is 5.0 or less relative to 1,000 carbons in the copolymer (A''). More preferably, the methyl branding degree is 3.0 or less relative to 1,000 carbons in the copolymer (A''). When the methyl branching satisfies the numerical value, then the copolymer may have a high elastic modulus and the mechanical strength of the copolymer molded product can be high.

The methyl branching degree can be controlled by selecting the transition metal catalyst to be used and by changing the polymerization temperature. As a concrete method of lowering the methyl branching degree of the copolymers, it is effective to lower the polymerization temperature. For example, by controlling the factors, it is desired to control the product to fall within a desired copolymer region.

Of the multinary olefin copolymer (A'') of the present invention, preferably, the ratio of the weight-average molecular weight (Mw) to the number-average molecular weight (Mn), as obtained through gel permeation chromatography (GPC), falls within a range of from 1.5 to 3.5. More preferably, the ratio falls within a range of from 1.6 to 3.3, even more preferably from 1.7 to 3.0.

When the ratio Mw/Mn satisfies the range, then the workability of the copolymer such as typically moldability thereof into laminates may be sufficient, and the adhesive strength thereof may be excellent. Mw/Mn can be controlled by selectin the transition metal catalyst to be used.

Of the multinary olefin copolymer (A'') of the present invention, preferably, the melting point is from 50° C. to 140° C. More preferably, the melting point is from 60° C. to 138° C., even more preferably from 70° C. to 135° C. Satisfying the range, the copolymer may have excellent heat resistance and adhesiveness.

The melting point may be controlled by selecting the transition metal catalyst to be used and by changing the monomer amount to be added during polymerization.

[III] Regarding Production of Polar Group-Containing Olefin Copolymer (A), Polar Group-Containing Olefin Copolymer (A'), Multinary Polar Olefin Copolymer (A'')

Regarding the production method for the polar group-containing olefin copolymer of the present invention, the copolymer may be obtained through copolymerization of at least one of ethylene and α-olefins having from 3 to 20 carbon atoms, and at least one polar group-containing monomer having a carboxyl group or a dicarboxylic acid anhydride group, using a transition metal catalyst.

(1) Polymerization Catalyst

The type of the polymerization catalyst in the present invention is not specifically defined so far as the catalyst enables copolymerization of ethylene or an α-olefin having from 3 to 20 carbon atoms, and a polar group-containing monomer having a carboxyl group or a dicarboxylic acid anhydride group. For example, there is mentioned a method of polymerization using a transition metal compound having a chelating ligand and belonging to any of Groups 5 to 11, as the catalyst.

Preferred examples of the transition metal include a vanadium atom, a niobium atom, a tantalum atom, a chromium atom, a molybdenum atom, a tungsten atom, a manganese atom, an iron atom, a platinum atom, a ruthenium atom, a cobalt atom, a rhodium atom, a nickel atom, a palladium atom, a copper atom, etc.

Of those, preferred area a vanadium atom, an iron atom, a platinum atom, a cobalt atom, a nickel atom, a palladium atom and a rhodium atom; and more preferred are a platinum atom, a cobalt atom, a nickel atom, a palladium atom, and a rhodium atom. Especially preferred is an element of Group 10, from the viewpoint of the polymerization activity thereof, and preferred is a nickel atom or a palladium atom. Especially from the viewpoint of the cost or the like thereof, nickel (II) is preferred. One alone or multiple types of those metals may be used here either singly or as combined.

The chelating ligand has at least two atoms selected from a group consisting of P, N, O and S, includes a bidentate or multidentate ligand, and is electronically neutral or anionic. The structure is exemplified in a review by Brookhart et al. (Chem. Rev., 2000, 100, 1169).

Preferably, as bidentate P and O ligands, for example, there are mentioned phosphorus-sulfonic acid, phosphorus-carboxylic acid, phosphorus-phenol, phosphorus-enolate, etc. In addition, as bidentate N and O ligands, for example, there are mentioned salicylaldiminate and pyridine-carboxylic acid. Further mentioned are a diimine ligand, a diphenoxide ligand, and a diamide ligand.

As the structure of the metal complex favorable for obtaining the polar group-containing olefin copolymer of the present invention, there is mentioned a transition metal catalyst coordinated with a chelating ligand of an arylphosphine compound, an arylarsine compound or an arylantimony compound optionally having a substituent, and especially there is mentioned a transition metal catalyst having a palladium or nickel metal coordinated with a triarylphosphine or triarylarsine compound optionally having a substituent.

Further, at least one aryl group in the triarylphosphine compound or the triarylarsine compound is preferably a phenyl group substituted with a secondary or tertiary alkyl group.

Especially preferred are transition metal complexes represented by the following structural formula (A) and/or (B), from the viewpoint of the polymerization activity thereof:

[Chem. 14]

Structural Formula (A)

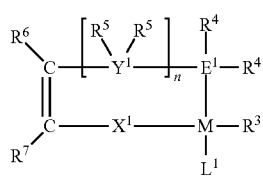

[Chem. 15]

Structural Formula (B)

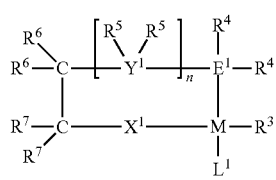

(In the structural formulae (A) and (B), M represents the above-mentioned transition metal. $X^1$ represents an oxygen atom, sulfur, $-SO_3-$ or $-CO_2-$. $Y^1$ represents carbon or silicon. n indicates an integer of 0 or 1. $E^1$ represents phosphorus, arsenic or antimony. $R^3$ and $R^4$ each independently represent a hydrogen atom or a hydrocarbon group having from 1 to 30 carbon atoms and optionally containing a hetero atom. $R^5$ each independently represents a hydrogen atom, a halogen atom, or a hydrocarbon group having from 1 to 30 carbon atoms and optionally containing a hetero atom. $R^6$ and $R^7$ each independently represent a hydrogen atom, a halogen atom, a hydrocarbon group having from 1 to 30 carbon atoms and optionally containing a hetero atom, $OR^2$, $CO_2R^2$, $CO_2M'$, $C(O)N(R^1)_2$, $C(O)R^2$, $SR^2$, $SO_2R^2$, $SOR^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group. M' represents an alkali metal, an alkaline earth metal, ammonium, a quaternary ammonium or phosphonium, x indicates an integer of from 0 to 3, y indicates an integer of from 0 to 2. $R^6$ and $R^7$ may bond to each other to form an alicyclic ring, an aromatic ring, or a hetero ring containing a hetero atom selected from oxygen, nitrogen and sulfur. In this case, the number of the ring-constituting atoms is from 5 to 8, and the ring may have or may not have a substituent thereon. $R^1$ represents a hydrogen atom, or a hydrocarbon group having from 1 to 20 carbon atoms. $R^2$ represents a hydrocarbon group having from 1 to 20 carbon atoms. $L^1$ represents a ligand coordinating with M. $R^3$ and $L^1$ may bond to each other to form a ring.)

More preferred is a transition metal complex represented by the following structural formula (C).

[Chem. 16]

Structural Formula (C)

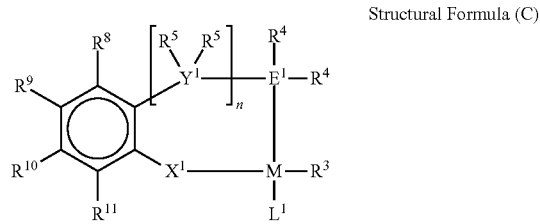

(In the structural formula (C), M represents the above-mentioned transition metal. $X^1$ represents an oxygen atom, sulfur, $-SO_3-$ or $-CO_2-$. $Y^1$ represents carbon or silicon. n indicates an integer of 0 or 1. $E^1$ represents phosphorus, arsenic or antimony. $R^3$ and $R^4$ each independently represent a hydrogen atom or a hydrocarbon group having from 1 to 30 carbon atoms and optionally containing a hetero atom. $R^5$ each independently represents a hydrogen atom, a halogen atom, or a hydrocarbon group having from 1 to 30 carbon atoms and optionally containing a hetero atom. $R^8$, $R^9$, $R^{10}$ and $R^{11}$ each independently represent a hydrogen atom, a halogen atom, a hydrocarbon group having from 1 to 30 carbon atoms and optionally containing a hetero atom, $OR^2$, $CO_2R^2$, $CO_2M'$, $C(O)N(R^1)_2$, $C(O)R^2$, $SR^2$, $SO_2R^2$, $SOR^2$, $OSO_2R^2$, $P(O)(OR^2)_{2-y}(R^1)_y$, CN, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group. M' represents an alkali metal, an alkaline earth metal, ammonium, a quaternary ammonium or phosphonium, x indicates an integer of from 0 to 3, y indicates an integer of from 0 to 2. Multiple groups suitably selected from $R^8$ to $R^{11}$ may bond to each other to form an alicyclic ring, an aromatic ring, or a hetero ring containing a hetero atom selected from oxygen, nitrogen and sulfur. In this case, the number of the ring-constituting atoms is from 5 to 8, and the ring may have or may not have a substituent thereon. $R^1$ represents a hydrogen atom, or a hydrocarbon group having from 1 to 20 carbon atoms. $R^2$ represents a hydrocarbon group having from 1 to 20 carbon atoms. $L^1$ represents a ligand coordinating with M. $R^3$ and $L^1$ may bond to each other to form a ring.)

Here, as a catalyst of the transition metal compound of Groups 5 to 11 having a chelating ligand, typically there are known so-called Shop catalyst and Drent catalyst.

The Shop catalyst is a catalyst in which a phosphorus ligand having an aryl group and optionally having a substituent is coordinated with a transition metal of Groups 9 to 11, preferably with a nickel metal (for example, see WO2010/050256). The Drent catalyst is a catalyst in which a phosphorus ligand having an aryl group and having an $SO_3$ group is coordinated with a transition metal of Groups 8 to 10, preferably with a palladium metal (for example, see JP-A 2010-202647).

(2) Use Mode of Polymerization Catalyst

The polymerization catalyst in the present invention may be used either singly or as carried by a carrier. The usable carrier may be any known carrier not detracting from the main purport of the present invention.

In general, favorably used here is an inorganic oxide or a polymer carrier. Concretely, there are mentioned $SiO_2$, $Al_2O_3$, MgO, $ZrO_2$, $TiO_2$, $B_2O_3$, CaO, ZnO, BaO, $ThO_2$ or their mixtures; and also usable here are mixed oxides such as $SiO_2$—$Al_2O_3$, $SiO_2$—$V_2O_5$, $SiO_2$—$TiO_2$, $SiO_2$—MgO, $SiO_2$—$Cr_2O_3$ or the like, as well as inorganic silicates, polyethylene carriers, polypropylene carriers, polystyrene carriers, polyacrylic acid carriers, polymethacrylic acid carriers, polyacrylate carriers, polyester carriers, polyamide carriers, polyimide carriers, etc.

These carriers are not specifically defined in point of the particle size, the particle size distribution, the pore volume and the specific surface area thereof, and any ones are usable here.

The catalyst component may be subjected to preliminary polymerization in the presence of an olefin in or out of the polymerization tank. Olefin means a hydrocarbon having at least one carbon-carbon double bond, and its examples include ethylene, propylene, 1-butene, 1-hexene, 3-methylbutene-1, styrene, divinylbenzene, etc. However, the olefin for use herein is not specifically defined in point of the type thereof, and may be in the form of a mixture with any other olefin. Preferred here is an olefin having 2 or 3 carbon atoms. The method of feeing olefin may be any desired one, including a method of feeding an olefin into a reactor constantly or so as to maintain a constant pressure state therein, or a combined method or a method of stepwise changing the condition.

(3) Copolymerization Reaction

The copolymerization reaction in the present invention is carried out in the presence or absence of a hydrocarbon solvent or a liquefied α-olefin or the like liquid such as propane, n-butane, isobutane, n-hexane, n-heptane, toluene, xylene, cyclohexane, methylcyclohexane, etc., or a polar solvent such as diethyl ether, ethylene glycol dimethyl ether, tetrahydrofuran, dioxane, ethyl acetate, methyl benzoate, acetone, methyl ethyl ketone, formamide, acetonitrile, methanol, isopropyl alcohol, ethylene glycol, etc. Also usable is a mixture of those liquid compounds mentioned here, as a solvent. For obtaining high polymerization activity and a high molecular weight, more preferred is use of the above-mentioned hydrocarbon solvent.

The copolymerization in the present invention may be carried out in the presence or absence of any known additive. As the additive, preferred are a radical polymerization inhibitor and an additive having the action of stabilizing the formed copolymer. For example, quinone derivatives and hindered phenol derivatives are preferred examples of the additive.

Concretely, usable her are monomethyl ether hydroquinone, 2,6-di-t-butyl-4-methylphenol (BHT), a reaction product of trimethylammonium and BHT, a reaction product of a tetravalent titanium alkoxide and BHT, etc.

As the additive, also usable here is an inorganic or organic filler, and the polymerization may be carried out in the presence of such a filler.

(4) Polymerization Method

In the present invention, the polymerization method is not specifically defined. Preferred here is slurry polymerization in which at least a part of the formed polymer is a slurry in the medium, bulk polymerization in which a liquefied monomer itself is used as a medium, vapor-phase polymerization to be carried out in a vaporized monomer, or high-pressure ionic polymerization in which at least a part of the formed polymer dissolved in the monomer having been liquefied at a high temperature and under a high pressure.

The polymerization mode may be any mode of batch polymerization, semi-batch polymerization or continuous polymerization. Also employable here is living polymerization, or a mode of polymerization accompanied by chain transfer. Further, acceptable is chain-shuttling reaction using a chain-shuttling agent (CSA), or coordinative chain transfer polymerization (CCTP).

For concrete production processes and conditions, for example, referred to are JP-A 2010-260913 and 2010-202647.

The copolymerization temperature, the copolymerization pressure and the copolymerization time are not specifically defined. In general, most suitable conditions may be set from the range mentioned below in consideration of the productivity and the process performance.

Specifically, the copolymerization temperature may be selected within a range of generally from −20° C. to 290° C., preferably from 0° C. to 250° C. The copolymerization pressure may be selected within a range of generally from 0.1 MPa to 100 MPa, preferably from 0.3 MPa to 90 MPa, the copolymerization time may be selected with a range of generally from 0.1 minutes to 10 hours, preferably from 0.5 minutes to 7 hours, more preferably from 1 minute to 6 hours.

In the present invention, the copolymerization may be carried out generally in an inert gas atmosphere. For example, usable is a nitrogen or argon atmosphere, and a nitrogen atmosphere is preferred. A small amount of oxygen or air may be present in the atmosphere.

Feeding the catalyst and the monomer to the copolymerization reactor is not specifically defined, for which are employable various feeding methods in accordance with the intended objective. For example, for batch-wise polymerization, there may be employed a method of previously feeding a predetermined amount of a monomer to the copolymerization reactor followed by feeding a catalyst thereinto. In this case, any additional monomer and any additional catalyst may be fed to the copolymerization reactor. For continuous polymerization, there may be employed a method of feeding a predetermined amount of a monomer and a predetermined amount of a catalyst to the copolymerization reactor either continuously or intermittently to thereby carry out the copolymerization reaction continuously.

Regarding control of the composition of the copolymer, in general, there may be employed a method of feeding multiple monomers into the reactor and changing the feeding ratio thereof. In addition, there are mentioned a method of controlling the copolymerization composition by utilizing the difference in the monomer reactivity ratio owing to the difference in the structure of the catalyst, and a method of controlling the copolymerization composition by utilizing the polymerization temperature dependence of the monomer reactivity ratio.

For molecular weight control of the copolymer, employable here is any conventional known method. Specifically, there are mentioned a method of controlling the molecular weight by controlling the polymerization temperature, a method of controlling the molecular weight by controlling the monomer concentration, a method of controlling the molecular weight by the use of a chain transfer agent, a method of controlling the molecular weight by controlling the ligand structure in the transition metal complex.

In the case of using a chain transfer agent, any conventional known chain transfer agent may be used. For example, hydrogen, metal alkyl or the like may be used.

[IV] Regarding Olefin Resin Composition

The olefin resin composition of the third aspect of the present invention is more concretely a resin composition containing the following component (A) and component (B) in a specific blend ratio thereof.

An olefin resin composition (C) containing a polar group-containing olefin copolymer (A) obtained through copolymerization of at least one polar monomer selected from ethylene and α-olefins having from 3 to 20 carbon atoms, and at least one polar group-containing monomer containing a carboxyl group or a dicarboxylic acid anhydride group, in the presence of a transition metal catalyst, and an olefin resin (B), wherein the amount of the olefin resin (B) is from 25 to 100,000 parts by weight relative to 100 parts by weight of the polar group-containing olefin copolymer (A).

(1) Essential Characteristics of Polar Group-Containing Olefin Copolymer (A)

The polar group-containing olefin copolymer (A) that is the essential component in the present invention is a copolymer of at least one polar monomer selected from ethylene and α-olefins having from 3 to 20 carbon atoms, and at least one polar group-containing monomer containing a carboxyl group or a dicarboxylic acid anhydride group.

The molecular structure of the polar group-containing olefin copolymer (A) and the production method for the copolymer are basically the same as those for the above-mentioned polar group-containing olefin copolymer (A') having specific properties, except that some physicality definition of the weight-average molecular weight (Mw) or the like for the latter is not indispensable for the former.

(2) Weight-Average Molecular Weight (Mw) of Polar Group-Containing Olefin Copolymer (A)

It is desirable that the weight-average molecular weight (Mw) of the polar group-containing olefin copolymer (A) is generally within a range of from 1,000 to 1,000,000, preferably from 5,000 to 500,000, more preferably from 10,000 to 300,000.

When Mw is less than 1,000, then the resin properties such as mechanical strength and impact resistance would not be sufficient; but when more than 1,000,000, the melt viscosity would be extremely high and it would be difficult to mold the resin composition.

In case where the polar group-containing olefin copolymer (A) is used as an adhesive material by itself, the range of the physical properties thereof (weight-average molecular weight and structural unit amount of polar group-containing monomer) is limited, as defined hereinabove for (A'); however, in the resin composition of the present invention, the copolymer is blended with a suitable amount of an olefin resin (B), and therefore the adhesiveness level of the composition can be greatly increased and a wide range of a polar group-containing olefin copolymer can be used in the composition.

(3) Other Properties of Polar Group-Containing Olefin Copolymer (A)

The preferred range of the other properties of the polar group-containing olefin copolymer (A) is the same as that described in the section of the polar group-containing olefin copolymer (A') having specific physical properties given hereinabove.

(4) Regarding Olefin Resin (B)

In the resin composition (C) of the present invention, the olefin resin (B) is not specifically defined. The olefin resin (B) may be selected from a homopolymer of ethylene or an α-olefin having from 3 to 20 carbon atoms, a copolymer through polymerization of ethylene and a monomer selected form α-olefins having from 3 to 20 carbon atoms, or a copolymer through copolymerization of two or more monomers selected from ethylene and α-olefins having from 3 to 20 carbon atoms, and a copolymer of a monomer selected form ethylene and α-olefins having from 3 to 20 carbon atoms, and a polar group-containing vinyl monomer, which are obtained according to a high-pressure radical polymerization method, a high, middle or low-pressure method using a Ziegler catalyst, a Philips catalyst or a single-site catalyst or any other conventional known method. Above all, preferred is an ethylene homopolymer, or a copolymer of ethylene and an α-olefin having from 3 to 20 carbon atoms, or a copolymer of ethylene and a polar group-containing vinyl monomer.

(5) Homopolymer

The homopolymer of the olefin resin (B) is obtained through homopolymerization of a monomer selected from ethylene and α-olefins having from 3 to 20 carbon atoms. The α-olefin having from 3 to 20 carbon atoms includes propylene, 1-butene, 4-methyl-1-pentene, 1-hexene, 1-octene, 1-dodecene, etc. As the preferred homopolymer, there are mentioned an ethylene homopolymer, a propylene homopolymer, a 1-butene homopolymer, a 1-hexene homopolymer, a 1-octene homopolymer, a 1-dodecene homopolymer, etc. More preferred are an ethylene homopolymer and a propylene homopolymer.

(6) Copolymer

In the olefin resin (B), the copolymer obtained through copolymerization of two or more monomers selected from ethylene and α-olefins having from 3 to 20 carbon atoms is not specifically defined and may be any copolymer to be obtained by polymerizing two or more monomers selected from ethylene and α-olefins having from 3 to 20 carbon atoms. The monomers to be polymerized may be two or more monomers, or may also be three or more monomers. As the copolymer of two or more monomers selected from ethylene and α-olefins having from 3 to 20 carbon atoms, preferred is a copolymer of ethylene and an α-olefin having from 3 to 20 carbon atoms. More preferred is a copolymer of ethylene and an α-olefin having from 3 to 10 carbon atoms. Even more preferred for use herein is a copolymer of ethylene and one or more α-olefins selected from propylene, 1-butene, 1-hexene and 1-octene.

(7) Other Polar Group-Containing Copolymer

In the olefin resin (B), the copolymer of a monomer selected from ethylene and α-olefins having from 3 to 20 carbon atoms, and a polar group-containing vinyl monomer is not specifically defined and may be any copolymer to be obtained through polymerization of a monomer selected form ethylene and α-olefins having from 3 to 20 carbon atoms, and a polar group-containing vinyl monomer.

The monomer selected from ethylene and α-olefins having from 3 to 20 carbon atoms may be one or more, and the polar group-containing vinyl monomer may also be one or more. The monomers to be used in polymerization to give the copolymer of a monomer selected form ethylene and α-olefins having from 3 to 20 carbon atoms and a polar group-containing vinyl monomer may be two or may be three or more. As the copolymer of a monomer selected from ethylene and α-olefins having from 3 to 20 carbon atoms and a polar group-containing vinyl monomer, preferred is a copolymer of ethylene and a polar group-containing vinyl monomer.

The polar group-containing polymer of the olefin resin (B) to be contained in the olefin resin composition must not be the same as the polar group-containing olefin copolymer (A) to be contained therein; however, any one that differs in point of the type of the polar group-containing monomer to be contained therein, the compositional ratio and the resin properties may be incorporated in the composition.

The polar group-containing vinyl monomer that is used in copolymerization of a monomer selected from ethylene and α-olefins having from 3 to 20 carbon atoms and a polar group-containing vinyl monomer is at least one monomer selected from a carboxylic acid group or acid anhydride group-containing monomer (a), an ester group-containing monomer (b), a hydroxyl group-containing monomer (c), an amino group-containing monomer (d), and a silane group-containing monomer (e).

The carboxylic acid group or acid anhydride group-containing monomer (a) includes α,β-unsaturated dicarboxylic acids or their anhydrides such as maleic acid, fumaric acid, citraconic acid, itaconic acid, etc.; and unsaturated monocarboxylic acids such as acrylic acid, methacrylic acid, furan acid, crotonic acid, vinyl acetate, pentenoic acid, etc.

The ester group-containing monomer (b) includes methyl acrylate, methyl methacrylate, ethyl acrylate, ethyl methacrylate, butyl acrylate, butyl acrylate, etc. Especially preferred is methyl acrylate.

The hydroxyl group-containing monomer (C) includes hydroxyethyl (meth)acrylate, 2-hydroxypropyl (meth)acrylate, etc.

The amino group-containing monomer (d) includes aminoethyl (meth)acrylate, dimethylamino ethyl (meth)acrylate, diethylamino ethyl (meth)acrylate, cyclohexylaminoethyl (meth)acrylate, etc.

The silane group-containing monomer (e) includes unsaturated silane compounds such as vinyltrimethoxysilane, vinyltriethoxysilane, vinyltriacetylsilane, vinyltrichlorosilane, etc.

(8) Production Method for Olefin Resin (B)

The production method for the olefin resin (B) is not specifically defined. For example, the resin may be produced according to a known high-pressure radical polymerization method such as a tubular method, an autoclave method or the like, or a high, middle or low-pressure method using a Ziegler catalyst, a Philips catalyst or a single-site catalyst, or any other known method.

(9) Regarding Resin Composition (C)

The resin composition (C) comprises the polar group-containing copolymer (A) incorporated with the olefin resin (B) in an amount of from 25 to 100,000 parts by weight relative to 100 parts by weight of the copolymer. The amount of the olefin resin (B) to be incorporated is preferably from 25 to 20,000 parts by weight, more preferably from 25 to 9,900 parts by weight, even more preferably from 28 to 5,000 parts by weight, still more preferably from 30 to 3,500 parts by weight. When the amount of the olefin resin (B) is less than 25 parts by mass or more than 100,000 parts by mass, the adhesiveness of the resin composition (C) is poor.

Figure 2:
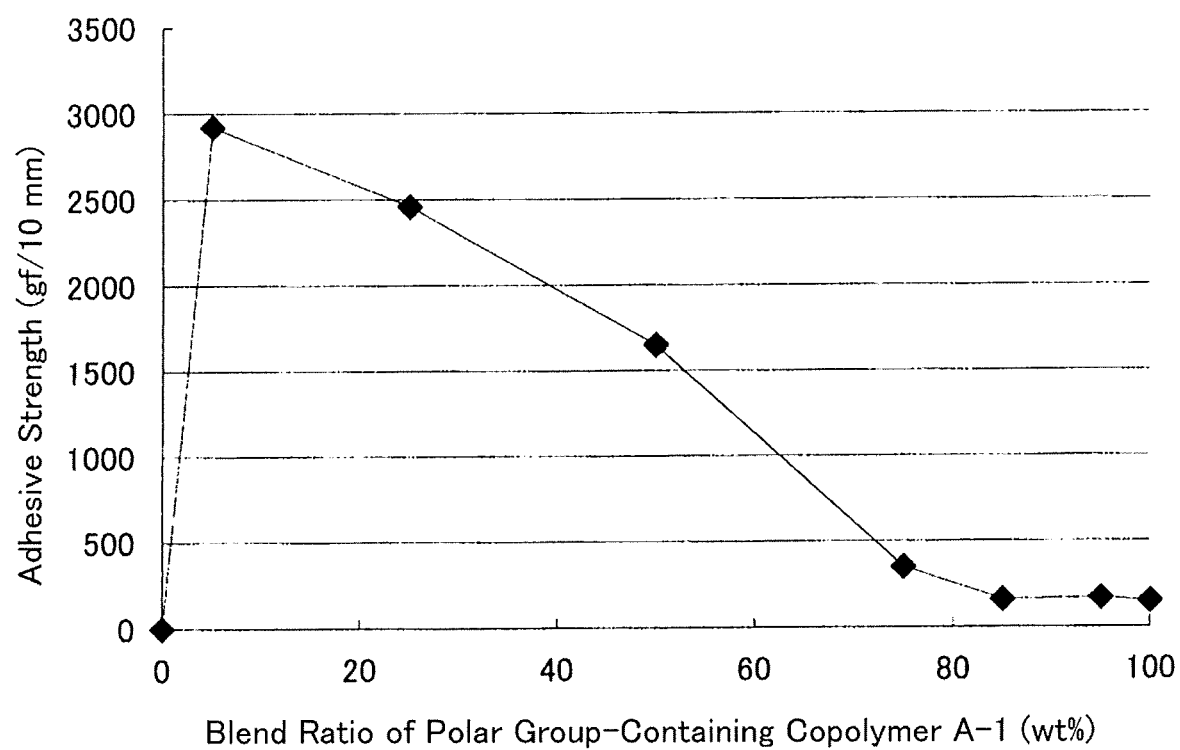
FIG. 2 is a graph showing the change in the adhesive strength of a resin composition of the third aspect of the present invention, depending on the blend ratio of the polar group-containing olefin copolymer (A) in the composition.
Figure 3:
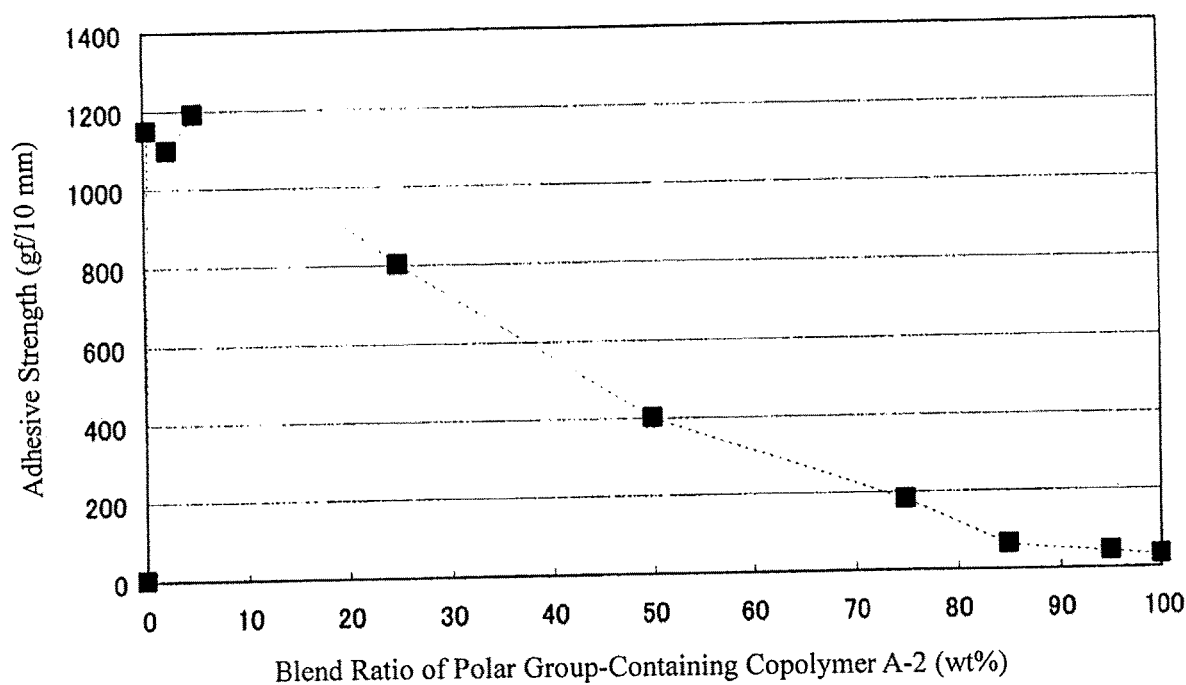
FIG. 3 is a graph showing the change in the adhesive strength of a resin composition of the third aspect of the present invention, depending on the blend ratio of the polar group-containing olefin copolymer (A) in the composition.

Examples of the present invention and Comparative Examples demonstrating the relationship between the blend ratio and the adhesion performance are collectively shown in FIG. 2 and FIG. 3. It is confirmed that, when the content of the polar group-containing olefin copolymer (A) is 80 wt % or less (or that is, when the content of the other olefin resin (B) is 25 parts by weight or more relative to 100 parts by weight of the polar group-containing olefin copolymer (A)), then the adhesion performance of the composition dramatically increases, as compared with that in the case where the polar group-containing olefin copolymer is sued alone. On the other hand, when the amount of the polar group-containing olefin copolymer (A) is too small (or that is, when the content of the other olefin resin (B) is more than 100,000 parts by weight), the adhesion performance lowers.

Though not clear, the reason why the resin composition exhibits excellent adhesiveness to high-polar different types of material when the amount of the olefin resin (B) to be incorporated in the resin composition (C) is within a range of from 25 to 100,000 parts by weight relative to 100 parts by weight of the polar group-containing olefin copolymer (A) is considered to be probably because it would be necessary that a molecular chain containing a polar group and a molecular chain not containing a polar group (or even though containing a polar group, the type of the polar group differs from that of the polar group in the former polar group-containing molecular chain) exist in the composition as a mixture thereof in a blend ratio falling within a specific range.

The adhesion performance of the olefin copolymer to high-polar different types of materials can be evaluated based on the numerical data measured in a peeling test such as shown by JIS K6854-1 to 4 "Adhesive Material Peeling Strength Test Method" (1999). It is considered that the numerical data measured according to the method would be a sum total of the chemical and physical bonding force at the interface between different types of materials and the cohesive force of the materials or the stress in deformation of the materials. When a resin composition in which all the molecular chains have a polar group is compared with a resin composition that comprises a combination of a molecular chain containing a polar group and a molecular chain not containing a polar group, it is presumed that the blend material such as the resin composition (C) can exhibit higher adhesiveness, since there occurs a difference in the cohesive force or the deformation stress in the peeling test or since the cohesive failure mode on the side of the resin composition differs.

Examples demonstrate that, when the blend ratio of the olefin resin (B) incorporated in the resin composition (C) falls within a range of from 25 to 100,000 parts by weight relative to 100 parts by weight of the polar group-containing olefin copolymer (A), then the adhesive strength increases, from which it is known that the adhesion increase could be expected when the blend ratio falls within that range.

In case where the blend ratio of the olefin resin (B) incorporated in the resin composition (C) is more than 100,000 parts by weight relative to 100 parts by weight of the polar group-containing olefin copolymer (A), the polar group content in the resin composition (C) extremely lowers and therefore the composition could not express adhesiveness.

One alone or plural polar group-containing olefin copolymers (A) may be contained in the resin composition (C). One alone or plural olefin resins (B) may also be contained in the composition.

(10) Production Method for Resin Composition (C)

The resin composition (C) (olefin resin composition) may be produced according to a known method, and for example, the composition may be produced according to a method of melt-kneading a polar group-containing olefin copolymer (A) and an olefin resin (B) and any other additive optionally to be added thereto, using a single-screw extruder, a double-screw extruder, a kneader, a Banbury mixer or the like, or a method of dissolving a polar group-containing olefin copolymer (A) and an olefin resin (B) and any other optional additive in a suitable good solvent (for example, a hydrocarbon solvent such as hexane, heptane, decane, cyclohexane, xylene, etc.), and then removing the solvent.

[V] Use Mode of Copolymer or Resin Composition (1) Additive

Additives such as antioxidant, UV absorbent, lubricant, antistatic agent, colorant, pigment, crosslinking agent, foaming agent, nucleating agent, flame retardant, filler and the like may be incorporated in the polar group-containing olefin copolymer (A'), the multinary polar olefin copolymer (A") or the resin composition (C) of the present invention, within a range not departing from the scope and the spirit of the present invention.

(2) Adhesive Material

The polar group-containing olefin copolymer (A'), the multinary polar olefin copolymer (A") or the resin composition (C) of the present invention exhibits high adhesiveness to any other substrate, and are therefore useful as adhesive materials, and further have made it possible to produce industrially useful laminates.

The superiority as adhesive materials is verified by the data in Examples given hereinunder and by comparison between Examples and Comparative Examples.

(3) Materials for Laminate

The laminate of the present invention contains a layer of the polar group-containing olefin copolymer (A'), the multinary polar olefin copolymer (A") or the resin composition (C) of the present invention and a substrate layer. As the substrate layer, there may be exemplified substrates of a polyolefin resin such as polyethylene, polypropylene or the like, a high-polar thermoplastic resin such as polyamide resin, polyester resin, saponified ethylene/vinyl acetate copolymer resin (EVOH) or the like, or a metal material of aluminium, steel or the like.

Specific examples of the substrates include films or sheets (stretched products, printed products thereof) of film-formable thermoplastic resins of, for example, polyethylene resins such as high-density polyethylene, middle-density polyethylene, low-density polyethylene, ethylene-vinyl acetate copolymer, ethylene-acrylate copolymer, etc.; ionomers; polypropylene resins such as homopolypropylene resin, copolymer of propylene and any other α-olefin, etc.; olefin resins such as poly-1-butene, poly-4-methyl-1-pentene, etc.; vinylic polymers such as polyvinyl chloride, polyvinylidene chloride, polystyrene, polyacrylate, polyacrylonitrile, etc.; polyamide resins such as nylon 6, nylon 66, nylon 10, nylon 11, nylon 12, nylon 610, polymetaxylylenadipamide, etc.; polyester resins such as polyethylene terephthalate, polyethylene terephthalate/isophthalate, polybutylene terephthalate, etc.; polyvinyl alcohol, ethylene/vinyl alcohol copolymer, polycarbonate resin, cellulosic polymer such as cellophane, etc.; metal foils or metal plates of aluminium, iron, copper or alloys comprising any of these as the main ingredient; inorganic oxide-deposited films such as silica-deposited plastic films, alumina-deposited plastic films, etc.; films deposited with a metal such as gold, silver, aluminium or the like or with any other compound than oxides of those metals; papers such as high-quality paper, kraft paper, board paper, glassine paper, synthetic paper, etc.; cellophane, woven fabric, nonwoven fabric, etc.

These substrate layers may be suitably selected depending on the intended use thereof and of the type of the material to be wrapped therewith. For example, when the substance to be wrapped is perishable food, then there may be used a resin excellent in transparency, stiffness and vapor permeation resistance, such as polyamide, polyvinylidene chloride, ethylene/vinyl alcohol copolymer, polyvinyl alcohol or polyester. On the other hand, when the substance to be wrapped is sweets or fibers, preferably used is polypropylene having good transparency, stiffness and moisture permeation resistance.

As barrier resins, there are mentioned polyamide resin, polyester resin, saponified ethylene/vinyl acetate copolymer (EVOH), polyvinylidene chloride resin, polycarbonate resin, oriented polypropylene (OPP), oriented polyester (OPET), oriented polyamide, films deposited with inorganic metal oxide such as alumina-deposited film or silica-deposited film, metal-deposited film such as aluminium-deposited film, metal foil, etc.

(4) Use of Laminate

The laminate of the present invention is favorable, for example, as a wrapping material for foods. Examples of foods include snack foods such as potato chips, etc.; confectionery such as biscuits, rice crackers, chocolates, etc.; powdery seasonings such as powder soup, etc.; other foods such as bonito flakes, smoked foods, etc.

A container may be produced by combining the laminates in such a manner that their ethylene copolymer layer sides are put facing to each other followed by heat-sealing a part of the thus-combined layer sides. Concretely, for example, the laminate is favorably used for liquid packaging, bags, liquid soup packaging, liquid paper cups, base films for lamination, special-form liquid packaging bags (standing pouches, etc.), standard bags, double bags, semi-heavy packing bags, wrapping films, sugar bags, oil packaging bags, other various types of packaging containers for food packaging, infusion bags, etc.

(5) Production of Laminate

As the working method for the laminate, there are mentioned various conventional known methods of, for example, lamination working, blow molding, pressure forming, injection molding, spin molding or the like, such as extrusion molding, extrusion lamination, sand lamination, dry lamination or the like of ordinary press forming, air-cooling inflation molding, air-cooling two-stage cooling inflation molding, high-speed inflation molding, flat die molding (T-die molding), water-cooling inflation molding or the like.

(6) Laminate Produced through Lamination

The laminate produced through lamination of the present invention is a laminate that can be produced according to a known lamination method of extrusion lamination, sand lamination, dry lamination or the like, and the laminate of the type may be produced through lamination using a laminating material that contains the polar group-containing olefin copolymer of the present invention, with at least one or more substrate layers.

In sand lamination or dry lamination, it is easy to laminate a layer of the above-mentioned aluminium foil, polyester film or various types of barrier films between the substrate to be used in the present invention and the layer that contains the polar group-containing olefin copolymer of the present invention, on the side of the substrate on which the layer that contains the polar group-containing olefin copolymer is formed, for improving the barrier performance of the resulting laminates.

For the substrate layer to be laminated with the laminating material in the present invention, suitably usable here are the materials described hereinabove for the substrate layer to be in the laminate of the present invention.

(7) Multilayer Coextrusion-Molded Product

The multilayer coextrusion-molded product of the present invention is a multilayer coextrusion-molded product capable of being produced through known multilayer co-extrusion molding, and is a multilayer coextrusion-molded product at least containing a layer that contains the polar group-containing olefin copolymer of the present invention. The multilayer coextrusion-molded product means a molded product having a multilayer structure, which can be produced according to various forming methods of simultaneously extrusion-molding plural thermoplastic materials to thereby complex the plural materials into layers followed by forming the layered preform.

As the production method for the multilayer coextrusion-molded product of the present invention, there are mentioned known multilayer coextrusion molding methods of multilayer air-cooling inflation molding, multilayer air-cooling two-stage cooling inflation molding, multilayer high-speed inflation molding, multilayer water-cooling inflation molding, multilayer flat die molding (T-die molding), multilayer tubular molding, multilayer corrugate pipe forming, etc. For the substrate layer in the multilayer coextrusion-molded product of the present invention, suitably usable here are various materials described hereinabove as those for the substrate layer in the laminate of the present invention. By working a layer that contains the polar group-containing olefin copolymer of the present invention along with a suitable substrate according to a suitable forming method, the multilayer coextrusion-molded product of the present invention can be produced in the form of known multilayer coextrusion-molded products such as multilayer films, multilayer blow-molded products, multilayer tubular-molded products, multilayer sheets, other multilayer pipes, multilayer hoses, multilayer tubes, multilayer corrugate pipes, etc.

(8) Multilayer Film

The multilayer film in the present invention is a multilayer film capable of being produced according to a known multilayer film formation method, and is a multilayer film at least containing a layer that contains the polar group-containing olefin copolymer of the present invention and a substrate layer.

(9) Multilayer Blow-Molded Product

The multilayer blow-molded product in the present invention is a multilayer blow-molded product capable of being produced according to a known multilayer blow molding method, and is a multilayer blow-molded product at least containing a layer that contains the polar group-containing olefin copolymer of the present invention and a substrate layer.

(10) Multilayer Tubular-Molded Product

The multilayer tubular-molded product in the present invention is a multilayer tubular-molded product capable of being produced according to a known multilayer tubular-molding method, and is a multilayer tubular-molded product at least containing a layer that contains the polar group-containing olefin copolymer of the present invention and a substrate layer. The multilayer tubular-molding method in the present invention is, for example, a method of producing tubular-molded products by simultaneously extrusion-molding and complexing plural thermoplastic materials into layers of plural materials, then continuously ejecting the layered preform through a circular or profile ejection port to give tubular-molded products in accordance with the shape of the ejection port, and then forming, cooling and solidifying the product according to a suitable forming method and a cooling method. The ejection port form in the multilayer tubular-molding method in the present invention is not specifically defined, and may be selected from any known ejection port forms of circular, oval, polygonal and the like forms. Further, the forming method in the multilayer tubular-molding method in the present invention is not also specifically defined. There may be employed various known forming methods of a sizing plate method, an inner pressure sizing method, an inner diameter sizing method, a vacuum sizing method, a forming and cooling method of sandwiching the extruded melt material between mold parts followed by pressing it from the mandrel side or degassing it from the mold side, etc. For the cooling method, suitably employed is any of water cooling, air cooling, sandwiching between mold parts, etc. Further, the multilayer tubular-molded product once cooled and solidified may be reheated and may be worked into a different shape. For the substrate layer for the multilayer tubular-molded product in the present invention, usable here are various materials described hereinabove for the substrate layer for the laminate of the present invention.

(11) Multilayer Sheet

The multilayer sheet in the present invention is a multilayer sheet capable of being produced according to a known multilayer sheet formation method, and is a multilayer sheet at least containing a layer that contains the polar group-containing olefin copolymer of the present invention and a substrate layer. As the multilayer sheet formation method in the present invention, various known methods can be employed. For example, there is mentioned a method of simultaneously extrusion-molding and complexing plural thermoplastic materials into layers of plural materials, and then ejecting the multilayer preform through a known die such as a flat die, a circular die or the like into to give sheets. In these methods, if desired, the sheets may be trimmed or the circular sheets may be further worked by opening them. For the substrate layer for the multilayer sheet in the present invention, usable here are various materials described hereinabove for the substrate layer for the laminate of the present invention.

(12) Extrusion Molded Product

The extrusion molded product in the present invention is an extrusion molded product produced through extrusion molding of the polar group-containing olefin copolymer of the present invention. The extrusion molded product in the present invention can be produced according to known extrusion molding methods of various inflation molding modes of air-cooling inflation molding, air-cooling two-stage cooling inflation molding, high-speed inflation molding, water-cooling inflation molding or the like, or flat die molding, profile extrusion molding, tubular molding, calender molding, etc.

(13) Injection-Molded Product

The injection-molded product in the present invention is an injection-molded product produced through injection molding of the polar group-containing olefin copolymer of the present invention. For producing the injection-molded product in the present invention, usable are known methods.

(14) Complexed Injection-Molded Product

The complexed injection-molded product in the present invention is a complexed injection-molded product produced by injection-molding and complexing plural members that include at least a member containing the polar group-containing olefin copolymer of the present invention. In the complexed injection-molded product, two or more materials may be complexed, and for example, two members each containing a different type of the polar group-containing olefin copolymer of the present invention may be complexed, or a member containing the polar group-containing olefin copolymer of the present invention and a member of a substrate may be complexed. Further, three or more members may be complexed. The complexed injection-molded product in the present invention may be formed according to any known injection-molding method that enables complexing injection molding. The complexed injection-molded product may be one produced by complexing two or more members each containing the polar group-containing olefin copolymer of the present invention, however, in consideration of high adhesiveness to different types of materials that is a characteristic feature of the present invention, preferred is a complexed injection-molded product as complexed with a member of a different material. As the injection-molding method capable of producing the complexed injection-molded product, there are mentioned known methods. For example, there are mentioned a complexing method that comprises previously working the polar group-containing olefin copolymer of the present invention into a member according to a known method of extrusion molding, pressing, cutting or the like, and while the member is kept inserted in the inside of an injection mold, injecting a substrate material into the mold for complexing them; a complexing method that comprises previously working a substrate into a member, and while the substrate member is kept inserted in the inside of an injection mold, injecting the polar group-containing olefin copolymer of the present invention into the mold for complexing them; a complexing method that uses a multicolor injection-molding machine having plural injection units, and comprises subsequently injecting the polar group-containing olefin copolymer of the present invention and a substrate material into a mold in a suitable order and complexing them.

Regarding the type of the member to be complexed with the polar group-containing olefin copolymer of the present invention in the complexed injection-molded product in the present invention, various materials may be suitably used here that have been described hereinabove for the materials for the laminate of the present invention.

(15) Coated Metal Member

The coated metal member in the present invention is a coated metal member produced using the polar group-containing olefin copolymer of the present invention as a metal coating material and coating a metal with the metal coating material. The coated metal member in the present invention may be produced according to a known metal coating method. Examples of the coated metal member include, for example, coated steel tubes produced by coating the outer surface or the inner surface of a steel tube with the coating material optionally via an undercoat or the like, coated metal wires coated with the metal coating material, electric wires coated with the metal coating material, coated metals produced according to a fluidized immersion method using the coated metal material that has been processed into powder, coated metals produced according to an electrostatic coating method using the coated metal material that has been processed into powder, etc.

EXAMPLES

The present invention is described concretely with reference to Examples and Comparative Examples given below, and the reasonableness and the significance of the constitution of the present invention and the superiority over prior art of the present invention are verified by the preferred data in Examples and by comparison between Examples and Comparative Examples.

Experimental Example, Part 1

Copolymer (A') Having Specific Properties

The test methods for the properties of the polar group-containing olefin copolymer (A') produced in the present invention, and the test methods for the obtained laminate are as mentioned below.

(1) Polar Group-Containing Structural Unit Amount in Polar Group-Containing Olefin Copolymer The polar group-containing structural unit amount in the polar group-containing olefin copolymer was measured through $^{13}C$-NMR spectrometry. The details are described in the section of "(5) Structural unit amount of polar group-containing monomer" given hereinabove.

(2) Weight-Average Molecular Weight (Mw) and Molecular Weight Distribution Parameter (Mw/Mn)

The weight-average molecular weight (Mw) was measured through gel permeation chromatography (GPC). The molecular weight distribution parameter (Mw/Mn) was calculated as a ratio of Mw to Mn, Mw/Mn in which the number-average molecular weight (Mn) was further measured through gel permeation chromatography (GPC). The calculation method is described in detail in the section of "(6) Weight-average molecular weight (Mw) of polar group-containing olefin copolymer" given hereinabove.

(3) Melting Point

The melting point is indicated by the peak temperature of the endothermic curve measured with a differential scanning calorimeter (DSC). For the measurement, used was SII Nanotechnology's DSC (DSC7020) under the measurement condition mentioned below.

About 5.0 mg of a sample was charged in an aluminium pan, heated up to 200° C. at 10° C./min, then kept at 200° C. for 5 minutes, and the cooled down to 30° C. at 10° C./min. After kept at 30° C. for 5 minutes, the sample was again heated at 10° C. to draw the absorption curve thereof, in which the peak temperature is the melting point of the sample.

(4) Adhesive Strength

The adhesive strength was measured in a peeling test, in which a press plate of a polar group-containing olefin copolymer, an EVOH film and a polyamide film were prepared, and two of these were joined and hot-pressed to prepare a laminate. A preparation method and a measurement method are successively described.

<Preparation Method for Polar Group-Containing Olefin Copolymer Resin Plate>

A polar group-containing olefin copolymer was put into a hot pressing mold having a size of 50 mm×60 mm and a thickness of 1 mm, and pre-heated for 5 minutes in a hot-pressing machine having a surface temperature of 180° C., then repeatedly pressurized and depressurized to remove the residual vapor from the molten resin, and further this was pressurized up to 4.9 MPa and then kept as such for 5 minutes. Subsequently, this was transferred into a pressing machine having a surface temperature of 25° C., then kept therein under a pressure of 4.9 MPa for 3 minutes and cooled to give a polar group-containing olefin copolymer resin plate having a thickness of about 0.9 mm.

<Preparation Method for EVOH Film>

Using a multilayer T-die molding machine, a two-type three-layer film of which the center layer was EVOH and both outer layers were LLDPE was molded, and the outer layers of LLDPE were peeled to give an EVOH single-layer film having a thickness of 150 µm. The film molding condition was as follows.

Molding machine: two-type three-layer T-die
Molding temperature: 200° C.
Layer constitution: LLDPE/EVOH/LLDPE
Thickness: 350 µm (100 µm/150 µm/100 µm)
Outer layer: LLDPE (Japan Polyethylene's trade name: Novatec UF943), MFR=2.0 g/10 min, density=0.937/cm$^3$
Interlayer: EVOH (Kuraray's trade name: Eval F101B)

<Preparation Method for Polyamide Film>

Using a multilayer T-die molding machine, a two-type three-layer film of which the center layer was polyamide and both outer layers were LLDPE was molded, and the outer layers of LLDPE were peeled to give a polyamide single-layer film having a thickness of 150 µm. The film molding condition was as follows.

Molding machine: two-type three-layer T-die
Molding temperature: 250° C.
Layer constitution: LLDPE/EVOH/LLDPE
Thickness: 350 µm (100 µm/150 µm/100 µm)
Outer layer: LLDPE (Japan Polyethylene's trade name: Novatec UF943), MFR=2.0 g/10 min, density=0.937/cm$^3$
Interlayer: polyamide (Toray's trade name: Alamine CM1021FS)

<Preparation Method for Laminate of EVOH Film and Polar Group-Containing Olefin Copolymer>

The resin plate of polar group-containing olefin copolymer obtained according to the above-mentioned resin plate preparing method, and the EVOH film obtained according to the above-mentioned EVOH film preparing method, each cut in a size of 50 mm×60 mm, were joined and put into a hot-pressing mold having a size of 50 mm×60 mm and a thickness of 1 mm. Using a hot-pressing machine having a surface temperature of 200° C., this was pressed under 4.9 MPa for 4 minutes. Subsequently, this was transferred into a pressing machine having a surface temperature of 25° C., and kept therein under a pressure of 4.9 MPa for 3 minutes and was thus cooled to give a laminate of polar group-containing olefin copolymer and EVOH.

<Preparation Method for Laminate of Polyamide Film and Polar Group-Containing Olefin Copolymer>

The resin plate of polar group-containing olefin copolymer obtained according to the above-mentioned resin plate preparing method, and the polyamide film obtained according to the above-mentioned polyamide film preparing method, each cut in a size of 50 mm×60 mm, were joined and put into a hot-pressing mold having a size of 50 mm×60 mm and a thickness of 1 mm. Using a hot-pressing machine having a surface temperature of 250° C., this was pressed under 4.9 MPa for 3 minutes. Subsequently, this was transferred into a pressing machine having a surface temperature of 25° C., and kept therein under a pressure of 4.9 MPa for 3 minutes and was thus cooled to give a laminate of polar group-containing olefin copolymer and polyamide.

<Method for Measurement of Adhesive Strength of Laminate>

The laminate obtained according to the laminate preparing method was cut into a strip having a width of 10 mm. Using a Tensilon (by Toyo Seiki) tensile tester, the strip was T-peeled at a speed of 50 mm/min to measure the adhesive strength thereof. The unit of the adhesive strength was gf/10 mm. In case where the adhesive strength of the sample was extremely strong, the polar group-containing olefin copolymer layer yielded in the peeling test and was broken. This is a phenomenon that occurs since the adhesive strength of the laminate is higher than the tensile rupture strength, and it is considered that the adhesiveness of the layer is extremely high. In case where the adhesive strength could not be measured owing to the phenomenon, "Unpeelable" was given to the column of the adhesive strength measured result in each Example, from which it is judged that the layer adhered more highly than that in the case where the adhesive strength value was measured.

Example 1-1

Production of Drent Catalyst and Polymerization Therewith

In a fully nitrogen-purged 30-mL flask, palladium bis-dibenzylideneacetone and phosphorus-sulfonic acid ligand (I) were weighed each in an amount of 100 µmol, then dewatered toluene (10 mL) was added thereto and processed with an ultrasonic vibrator for 10 minutes to prepare a catalyst slurry.

Next, a stainless autoclave having an internal volume of 2.4 liters and equipped with an induction stirrer was purged with pure nitrogen, and pure toluene and 5-norbornene-2,3-dicarboxylic acid anhydride were introduced into the autoclave in a pure nitrogen atmosphere in such a manner that the polar group-containing monomer concentration therein could be 0.1 mol/L.

The previously prepared catalyst solution was added thereto, and the polymerization was started at 100° C. and under an ethylene pressure of 1 MPa. During the reaction, the temperature was kept at 100° C., and ethylene was continuously fed so as to maintain the pressure.

After the polymerization, ethylene was purged away, then the autoclave was cooled to room temperature, and the obtained polar group-containing olefin copolymer was reprecipitated in acetone (1 L). The precipitated copolymer was taken out through filtration. The solid polar group-containing olefin copolymer thus obtained through filtration was washed with acetone, dried at 60° C. under reduced pressure for 3 hours, and then finally the polar group-containing olefin copolymer was collected. The polymerization condition and the activity are shown in Table 1.

Examples 1-2 to 1-11, 1-14, Comparative Examples 1-1 to 1-6

Polar group-containing olefin copolymers of Examples 1-2 to 1-11, Example 1-14 and Comparative Examples 1-1 to 1-6 were prepared through polymerization according to the method of Example 1-1 except that the ligand species, the ligand amount, the polar group-containing monomer species, the polar group-containing monomer concentration, the polymerization pressure, the polymerization temperature and the polymerization time were changed. The polymerization condition and the activity are shown in Table 1. The chemical formulae of the ligand species (I) to (IV) in Table 1 are shown below. The analysis data of the polar group-containing olefin copolymers obtained in Examples and Comparative Examples, and the adhesive strength of the EVOH film are shown in Table 2. In Table 2, the end introduction means the polar group containing structural unit amount of the polar group-containing monomer introduced into the end of the copolymer; the main chain introduction means the polar group containing structural unit amount of the polar group-containing monomer introduced inside the molecular chain (main chain) thereof; and the total structural units mean the total amount of the introduced polar group-containing structural units. In Table 2, "ND" means not detectable.

[Chem. 17]

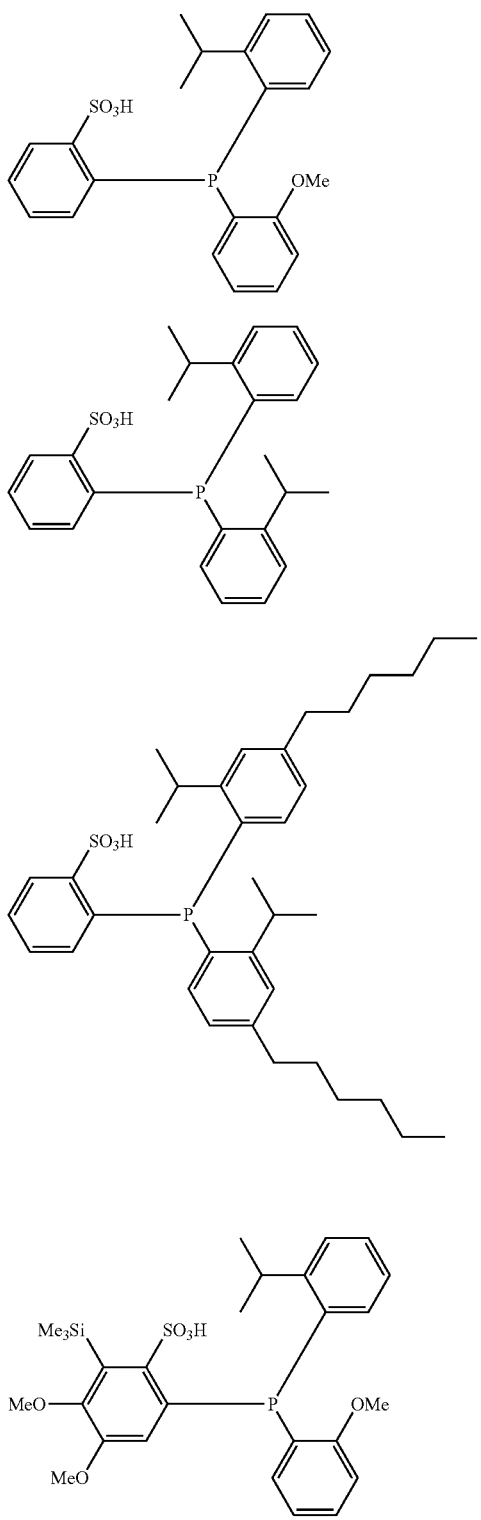

(I)

(II)

(III)

(IV)

Example 1-12

Synthesis of SHOP Ligand:
The following ligand B-27DM was obtained according to the method described in WO2010/050256 (Synthesis Example 4).

[Chem. 18]

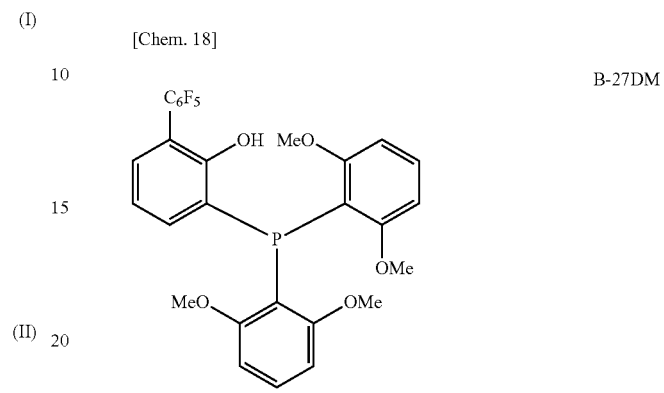

B-27DM

Formation of complex:

First, in a 50-ml eggplant flask, 112 mg (200 μmol) of the above B-27DM was weighed and put. Next, bis-1,5-cyclooctadiene nickel(0) (hereinafter referred to as Ni(COD)2) was weighed and put in a 50-ml eggplant flask, and dissolved in 20 ml of dry toluene to prepare a 10 mmol/l Ni(COD)2/toluene solution. The whole amount (20 ml) of the Ni(COD)2/toluene solution prepared here was added to the eggplant flask containing B-27DM therein, and stirred in a hot-water bath at 40° C. for 30 minutes to give 20 ml of a 10 mmol/l solution of a reaction product of B-27DM and Ni(COD)2.

Next, a stainless autoclave having an internal volume of 2.4 liters and equipped with an induction stirrer was purged with pure nitrogen, and pure toluene (1.0 L) and 5-norbornene-2,3-dicarboxylic acid anhydride (8.2 g) were introduced into the autoclave in a pure nitrogen atmosphere in such a manner that the polar group-containing monomer concentration therein could be 0.05 mol/L. The temperature of the autoclave was made 100° C., and then 1 ml of a toluene solution of trinormal-octylaluminium that had been diluted to be 0.1 mol/l was added thereto. Subsequently, nitrogen was introduced thereinto up to 0.3 MPa, and further ethylene was thereinto up to 2.8 MPa. After the temperature and the pressure were stabilized, 2 ml (20 μmol) of the previously-prepared complex solution was introduced into the autoclave under pressure to start the reaction. During the reaction, the temperature was kept at 100° C., and ethylene was continuously fed so as to maintain the pressure, and the polymerization was thus carried out for 30 minutes.

After the polymerization, ethylene was purged away, then the autoclave was cooled to room temperature, and the obtained polar group-containing olefin copolymer was precipitated in acetone (1 L). The precipitated copolymer was taken out through filtration. The solid polar group-containing olefin copolymer thus obtained through filtration was washed with acetone, dried at 60° C. under reduced pressure for 3 hours, and then finally the polar group-containing olefin copolymer was collected. The polymerization condition and the activity are shown in Table 1.

Example 1-13

A polar group-containing olefin copolymer of Example 1-14 was obtained through polymerization for 20 minutes according to the method described in Example 1-12, except that the concentration of the 5-norbornene-2,3-dicarboxylic acid anhydride was changed to 0.02 mol/l and the complex solution amount was changed to 0.5 ml (5 μmol as the complex). The analysis data of the polar group-containing olefin copolymers obtained in Examples and the adhesive strength between EVOH film and polyamide film are shown in Table 2.

TABLE 1

| | Ligand | | | Polar Group-Containing Monomer | Polymerization Condition | | | | |
|---|---|---|---|---|---|---|---|---|---|
| | Ligand Species | Amount μmol | Polar Group-Containing Monomer Species | Concentration mol/l | pressure MPa | temperature °C. | time min | Yield g | Activity g/mol MPa h |
| Example 1-1 | II | 100 | 5-Norbornene-2,3-dicarboxylic Anhydride | 0.1 | 1 | 100 | 60 | 87.6 | 8.80E+05 |
| Example 1-2 | I | 100 | 5-Norbornene-2,3-dicarboxylic Anhydride | 0.1 | 1 | 80 | 30 | 45.1 | 9.00E+05 |
| Example 1-3 | II | 100 | 5-Norbornene-2,3-dicarboxylic Anhydride | 0.05 | 0.6 | 80 | 45 | 25.9 | 5.80E+05 |
| Example 1-5 | I | 5 | 5-Norbornene-2,3-dicarboxylic Anhydride | 0.13 | 3 | 100 | 125 | 39.8 | 1.30E+06 |
| Example 1-6 | I | 5 | 5-Norbornene-2,3-dicarboxylic Anhydride | 0.25 | 3 | 100 | 90 | 53.1 | 2.40E+06 |
| Example 1-7 | I | 8 | 5-Norbornene-2,3-dicarboxylic Anhydride | 0.25 | 3 | 80 | 150 | 37.8 | 6.30E+05 |
| Example 1-8 | I | 5 | 5-Norbornene-2,3-dicarboxylic Anhydride | 0.25 | 2 | 100 | 90 | 25.1 | 1.70E+06 |
| Example 1-9 | III | 20 | 5-Norbornene-2,3-dicarboxylic Anhydride | 0.3 | 1 | 100 | 180 | 96.7 | 1.60E+06 |
| Example 1-10 | IV | 30 | 5-Norbornene-2,3-dicarboxylic Anhydride | 0.3 | 1 | 100 | 180 | 50.3 | 5.60E+05 |
| Example 1-11 | II | 100 | exo-3,6-Epoxy-1,2,3,6-tetrahydrophthalic Anhydride | 0.1 | 1 | 100 | 150 | 26.5 | 1.10E+05 |
| Example 1-12 | B-27DM | 20 | 5-Norbornene-2,3-dicarboxylic Anhydride | 0.05 | 2.5 | 100 | 30 | 20 | 8.00E+05 |
| Example 1-13 | B-27DM | 5 | 5-Norbornene-2,3-dicarboxylic Anhydride | 0.02 | 2.5 | 100 | 20 | 21.6 | 5.20E+06 |
| Example 1-14 | II | 30 | (2,7-octadien-1-yl)succinic anhydride | 0.25 | 1 | 100 | 60 | 72.7 | 2.40E+06 |
| Comparative Example 1-1 | I | 100 | 5-Norbornene-2,3-dicarboxylic Anhydride | 0.1 | 1 | 100 | 90 | 60.7 | 4.00E+05 |
| Comparative Example 1-2 | I | 40 | 5-Norbornene-2,3-dicarboxylic Anhydride | 0.25 | 1 | 100 | 180 | 56.9 | 4.70E+05 |
| Comparative Example 1-3 | I | 40 | 5-Norbornene-2,3-dicarboxylic Anhydride | 0.25 | 1 | 100 | 45 | 53.8 | 1.80E+06 |
| Comparative Example 1-4 | I | 20 | 5-Norbornene-2,3-dicarboxylic Anhydride | 0.3 | 1 | 100 | 90 | 54.4 | 1.80E+06 |
| Comparative Example 1-5 | II | 400 | Ethyl Acrylate | 6.1 | 1.5 | 80 | 170 | 34.1 | 2.00E+04 |
| Comparative Example 1-6 | I | 100 | (2,7-octadien-1-yl)succinic anhydride | 0.2 | 1 | 80 | 180 | 83.8 | 2.80E+05 |

TABLE 2

| | | Molecular | | | Adhesive strength | | Polar Group-Containing Structural Unit Amount | | |
|---|---|---|---|---|---|---|---|---|---|
| | | Weight-Average | Weight Distri- | | | | end | main chain | total structural |
| | Polar Group-Containing Monomer Species | Molecular Weight Mw * 10⁻⁴ | bution Parameter Mw/Mn | Melting Point °C. | EVOH gf/10 mm | Polyamide | intro-duction mol % | intro-duction mol % | unit amount mol % |
| Example 1-1 | 5-Norbornene-2,3-dicarboxylic Anhydride | 11.6 | 2.1 | 130.7 | 1170 | ND | 0.02 | 0.08 | 0.1 |
| Example 1-2 | 5-Norbornene-2,3-dicarboxylic Anhydride | 9.5 | 2.1 | 125.6 | 1110 | ND | 0.01 | 0.4 | 0.41 |
| Example 1-3 | 5-Norbornene-2,3-dicarboxylic Anhydride | 13.7 | 2.3 | 133.1 | 590 | ND | <0.01 | 0.03 | 0.03 |
| Example 1-5 | 5-Norbornene-2,3-dicarboxylic Anhydride | 5.6 | 1.9 | 129.5 | 480 | ND | <0.01 | 0.2 | 0.2 |
| Example 1-6 | 5-Norbornene-2,3-dicarboxylic Anhydride | 5.6 | 1.9 | 123.8 | 2100 | ND | <0.01 | 0.36 | 0.36 |
| Example 1-7 | 5-Norbornene-2,3-dicarboxylic Anhydride | 9.3 | 1.9 | 128.9 | 1350 | ND | <0.01 | 0.26 | 0.26 |
| Example 1-8 | 5-Norbornene-2,3-dicarboxylic Anhydride | 5.7 | 1.9 | 124.7 | 480 | ND | <0.01 | 0.49 | 0.49 |
| Example 1-9 | 5-Norbornene-2,3-dicarboxylic Anhydride | 8 | 2.1 | 129.9 | 460 | ND | <0.01 | 0.1 | 0.1 |
| Example 1-10 | 5-Norbornene-2,3-dicarboxylic Anhydride | 12.2 | 2.2 | 125.6 | 1810 | ND | 0.01 | 0.29 | 0.3 |
| Example 1-11 | exo-3,6-Epoxy-1,2,3,6-tetrahydrophthalic Anhydride | 9.5 | 1.9 | 133.6 | 620 | ND | ND | ND | ND |
| Example 1-12 | 5-Norbornene-2,3-dicarboxylic Anhydride | 9.8 | 2.4 | 123.4 | 1930 | Unpeelable | <0.01 | 0.62 | 0.62 |
| Example 1-13 | 5-Norbornene-2,3-dicarboxylic Anhydride | 9.9 | 2.2 | 127.1 | 2700 | Unpeelable | <0.01 | 0.3 | 0.3 |
| Example 1-14 | (2,7-octadien-1-yl)succinic anhydride | 8.9 | 2 | 128.9 | 1910 | ND | <0.01 | 0.12 | 0.12 |
| Comparative Example 1-1 | 5-Norbornene-2,3-dicarboxylic Anhydride | 4.2 | 2 | 122.2 | 100 | ND | 0.03 | 0.74 | 0.77 |
| Comparative Example 1-2 | 5-Norbornene-2,3-dicarboxylic Anhydride | 4.3 | 2 | 119.8 | 120 | ND | 0.02 | 1.11 | 0.13 |
| Comparative Example 1-3 | 5-Norbornene-2,3-dicarboxylic Anhydride | 4.2 | 2.1 | 118.2 | 110 | ND | 0.02 | 0.88 | 0.9 |
| Comparative Example 1-4 | 5-Norbornene-2,3-dicarboxylic Anhydride | 4.1 | 2 | 118.7 | 110 | ND | 0.03 | 0.71 | 0.74 |
| Comparative Example 1-5 | Ethyl Acrylate | 11 | 1.7 | 86.8 | 0 | ND | ND | ND | ND |

TABLE 2-continued

| | | Molecular | | | Adhesive strength | | Polar Group-Containing Structural Unit Amount | | |
|---|---|---|---|---|---|---|---|---|---|
| | | Weight-Average | Weight Distri- | | | | end | main chain | total structural |
| | Polar Group-Containing Monomer Species | Molecular Weight Mw * 10$^{-4}$ | bution Parameter Mw/Mn | Melting Point ° C. | EVOH gf/ 10 mm | Polyamide | intro-duction mol % | intro-duction mol % | unit amount mol % |
| Comparative Example 1-6 | (2,7-octadien-1-yl)succinic anhydride | 4.3 | 2.8 | 127.1 | 70 | ND | <0.01 | 0.33 | 0.33 |

Speculations on Results of Examples and Comparative Examples

The polar group-containing olefin copolymers of Example 1-1 to Example 1-14 all had a weight-average molecular weight (Mw) of not less than 45,000, and the adhesive strength thereof shows a numerical value that is considered to be sufficient in practical use.

As compared with these, the weight-average molecular weight (Mw) of Comparative Examples 1-1 to 1-4 and Comparative Example 1-6 is less than 45,000, and the adhesiveness thereof is insufficient.

In general, in order to make a polar group-containing polyolefin have high adhesive strength to high-polar materials, it is considered to be advantageous that the polar group content in the polymer is high. However, the fact that though the polar group monomer-derived structural unit amount was sufficiently large in Comparative Examples 1-1 to 1-4 and 1-6 as compared with that in Examples 1-1 to 1-15, the adhesiveness in the former was insufficient indicates that the polar group content does not unambiguously determine the adhesiveness but the weight-average molecular weight (Mw) of the polar group-containing olefin copolymer has a strong influence on the adhesiveness. Specifically, the present invention has clarified that when the weight-average molecular weight (Mw) is 45,000 or more and when the structural unit derived from the polar group-containing monomer is 0.001 mol % or more, then the copolymer expresses adhesiveness.

The polar group-containing olefin copolymers each contain 5-norbornene-2,3-dicarboxylic acid anhydride as the polar group-containing monomer therein in Examples 1-1 to 1-10, Example 1-12 and Example 1-13, 3,6-epoxy-1,2,3,6-tetrahydrophthalic acid anhydride as the polar group-containing monomer in Example 1-11, and 2,7-octadien-1-ylsuccinic acid anhydride as the polar group-containing monomer in Example 1-14. All these polar group-containing olefin copolymers each containing any such polar group-containing monomer exhibit sufficient adhesiveness. This fact indicates that the polar group-containing monomer species necessary for obtaining polar group-containing olefin copolymers having sufficient adhesiveness to high-polar materials is not specifically defined so far as the monomer species is a polar group-containing monomer that contains a carboxyl group or a dicarboxylic acid anhydride group.

The olefin copolymers of Comparative Examples 1 to 5 have a weight-average molecular weight (Mw) of 45,000 or more, in which, however, the polar group species contained is ethyl acrylate. The data have clarified that in order to make the copolymer have sufficient adhesiveness to high-polar materials such as EVOH or polyamide, the copolymer must be copolymerized with a monomer containing a carboxyl group or a dicarboxylic acid anhydride group.

The polar group-containing olefin copolymers of Example 1-12 and Example 1-13 were produced according to a production method differing from that for the copolymers of Examples 1-1 to 1-10. The data indicate that the polar group-containing olefin copolymers produced according to such different methods can have sufficient adhesiveness. The fact means that the production of polar group-containing olefin copolymers having sufficient adhesion performance to high-polar materials does not require any specific production method, and the production method for the copolymers is not specifically defined.

In addition, Example 1-12 and Example 1-13 demonstrate sufficient adhesion performance to polyamide not limited to EVOH. The fact has clarified that the polar group-containing olefin copolymers of the present invention have not only adhesiveness to specific high-polar materials but also sufficient adhesiveness to various high-polar materials.

The above-mentioned good results of Examples and the comparison thereof to Comparative Examples have clarified the significance and the reasonability of the constitution of the present invention (specified matters of invention) and the superiority thereof over prior art.

Experimental Example, Part 2

Experimental Example of Multinary Copolymer (A")

1. Evaluation Method
(1) Molecular Weight and Molecular Weight Distribution (Mw, Mn, Value Q)
(Measurement Condition)
  Apparatus used: Waters' 150C
  Detector: FOXBORO's MIRANIA•IR detector (measurement wavelength: 3.42 μm)
  Measurement temperature: 140° C.
  Solvent: orthodichlorobenzene (ODCB)
  Column: Showa Denko's AD806M/S (three columns)
  Flow rate: 1.0 mL/min,
  Injection amount: 0.2 mL
(Preparation of Samples)
  Using ODCB (containing 0.5 mg/mL of BHT (2,6-di-t-butyl-4-methylphenol)), a sample solution of 1 mg/mL was prepared, and dissolved at 140° C., taking about 1 hour.
(Calculation of Molecular Weight)
  According to a standard polystyrene method, the retention volume was converted into the molecular weight, using a standard polystyrene calibration curve prepared previously. The standard polystyrene reagents to be used were all Tosoh's brands, F380, F288, F128, F80, F40, F20, F10, F4, F1, A5000, A2500, A1000. 0.2 mL of a solution prepared by dissolving each standard reagent in ODCB to be 0.5 mg/mL (containing 0.5 mg/mL of BHT) was injected to prepare the calibration curve. For the calibration curve, used was the cubic equation obtained through approximation according to the method of least squares. For the viscosity equation $[\eta]=K\times M^{\alpha}$, the following numerical data were used.

PS: $K=1.38\times10^4$, $\alpha=0.7$
PE: $K=3.92\times10^4$, $\alpha=0.733$
PP: $K=1.03\times10^4$, $\alpha=0.78$ (2) Melting Point (Tm)

Using a differential scanning calorimeter, Seiko Instruments' DSC6200, 5 mg of sheet-like sample pieces were charged in an aluminium pan, then heated from room temperature once up to 200° C. at a heating rate of 100° C./min, kept as such for 5 minutes, thereafter cooled down to 20° C. at 10° C./min for crystallization, and then again heated up to 200° C. at 10° C./min to draw a melting curve of the sample.

The peak top temperature of the main endothermic peak in the final heating stage in the process of drawing the melting curve is the melting point Tm, and the peak area of the peak is ΔHm.

(3) NMR Analysis

As the solvent, used was a mixed solvent of orthodichlorobenzene/heavy bromobenzene (4/1). A sample having a concentration of 150 mg/2.4 mL was introduced into an NMR sample tube, then fully purged with nitrogen, and dissolved in a heat block at 130° C. to prepare a uniform solution. Using Bruker Avance III Cryo-NMR, 10 mmϕ cryo-probe, the sample was analyzed at 130° C.

The measurement condition was as mentioned below. $^1$H-NMR: solvent presaturation method, 18° pulse, number of scans 256, $^{13}$C-NMR: proton complete decoupling condition, 90° pulse, number of scans 512.

For quantitative determination of the partial structure, when the integral intensity in $^1$H-NMR is used, the integral intensity of the peak for the PE main chain of 2 ppm or less is standardized as 1,000, but when that in $^{13}$C-NMR is used, the integral intensity of the peak for the PE main chain of from 28 to 31.5 ppm is standardized as 1,000, and based on the integral intensity of these various characteristic peaks, the partial structure was quantified according to the following process.

[i] In $^1$H-NMR spectrum, the methyl intensity of the methoxy group of methyl acrylate (MA) at 3.6 ppm was multiplied by ⅔ to give a value $I_{MA}$. All MA existed independently in the chain, and therefore the value is approximately the number of MA's in the main chain, 1,000 C's.

[ii] In $^1$H-NMR spectrum, the sum of the peak intensity data of three methylene protons and one methine proton each bonding as a single bond to the oxygen at 3 ppm or from 3.3 to 3.5 ppm or 4.1 ppm of (4-glycidyloxybutyl) acrylate (4-HBAGE) was multiplied by 2/7 to give a value $I_{HBAGA}$. All 4-HBAGE existed independently in the chain, and therefore the value is approximately the number of 4-HBAGE's in the main chain, 1,000 C's.

[iii] In $^1$H-NMR spectrum, $I_{NB-DCA}$ was obtained from the methine proton adjacent to the carbonyl group at 3.1 ppm of norbornene-2,3-dicarboxylic acid anhydride (NB-DCA). This is approximately the number of NB-DC's (sum total of independent ones in the main chain and those at the unsaturated end) incorporated in the copolymer relative to the main chain 1,000 C's

[iv] For calculating the norbornene content, the intensity total of three peaks (33.1, 44.8, and 47.3 ppm) of norbornene in standardization of the PE main peak intensity at from 28.5 to 31/5 ppm to be 1,000 was divided by 5 to give $I_{NB}$. This is approximately the number of norbornene fragments incorporated in the copolymer relative to the main chain 1,000 C's.

[v] In $^{13}$C-NMR spectrum, the integral intensity for the signal by the methylene carbon adjacent to the methyl group of 1-hexene at 23.4 ppm was obtained. This is approximately the number of 1-hexene fragments incorporated into the copolymer relative to the main chain 1,000 C's.

[vi] In $^{13}$C-NMR spectrum, the integral intensity for the signal by the methyl carbon of the methyl branch at 20.0 ppm, $I_{Methyl}$ was obtained. this is the number of methyl branches per 1,000 carbons of the copolymer.

(4) MFR and FR

According to JIS K7210 (1999), MFR was measured at 190° C. and under a load of 2.16 kg. FR (flow rate ratio) was calculated as a ratio of $MFR_{10\ kg}$, which had been measured in the same manner at 190° C. and under a load of 10 kg, to MFR ($=MFR_{10\ kg}$/MFR).

(5) Density

The density was measured according to JIS K7112. Briefly, the strand obtained in MFR measurement was heated at 100° C. for 1 hour, and then left at room temperature for 1 hour, and thereafter the density was measured according to a density gradient tube method.

(6) Adhesive Strength

The adhesive strength was measured according to the same process as in the above-mentioned Experimental Example 1.

2. Ligand Synthesis

Ligands obtained in the following Synthesis Examples were used. Unless otherwise specifically indicated in the following Synthesis Examples, the operation was carried out in a pure nitrogen atmosphere, and the solvent was a dewatered and deoxygenated one.

The ligand structures used in Examples are shown below.

[Chem. 19]

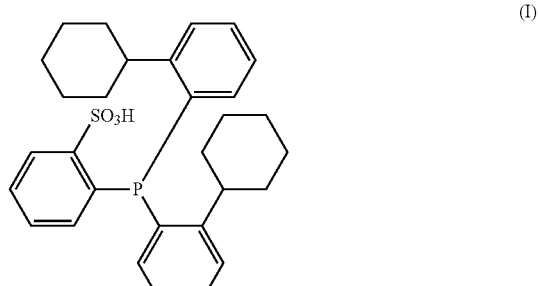

(I)

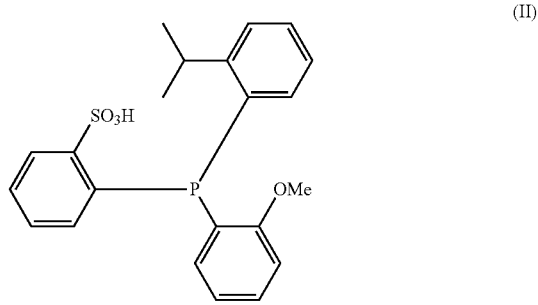

(II)

Synthesis Example 1

Synthesis of Ligand (I)

At 0° C., a normal butyllithium/hexane solution (2.5 M, 10 mL, 25.3 mmol) was gradually and dropwise added to a tetrahydrofuran (50 mL) solution of benzenesulfonic acid anhydride (2 g, 12.6 mmol), and stirred for 1 hour while the temperature was raised up to room temperature. The reaction liquid was cooled down to −78° C., and phosphorus trichloride (1.0 mL, 12.6 mmol) was added thereto and stirred for 2 hours (reaction liquid A).

At 0° C., a t-butyllithium/hexane solution (1.6 M, 31.6 mL, 50.6 mmol) was gradually and dropwise added to a tetrahydrofuran (50 mL) solution of 1-bromo-2-cyclohexylbenzene (6 g, 25.3 mmol), and stirred for 1 hour. The solution was dropwise added to the previous reaction liquid A at −78° C., and stirred overnight at room temperature. LC-MS purity 50%/water (200 mL) was added thereto and acidified (pH<3) with hydrochloric acid added thereto. After extraction with methylene chloride (100 mL×3), this was dried with sodium sulfate, and the solvent was evaporated away. This was purified through silica gel column chromatography (dichloromethane/methanol=50/1) to give 1.0 g of a white product.

$^1$H-NMR (CDCl$_3$, ppm): 7.86 (m, 1H), 7.30 (dt, J=1.2, 7.6 Hz, 1H), 7.24-7.15 (m, 5H), 6.96 (m, 21H), 6.83 (m, 1H), 6.57 (m, 2H), 3.21 (br, 2HH), 1.55 (br, 8H), 1.31 (br, 4H), 1.14 (br, 8H).
$^{31}$P-NMR (CDCl$_3$, ppm): −28.7.

Synthesis Example 2

Synthesis of Phosphorus-Sulfonic Acid Ligand (II)

At 0° C., a normal butyllithium/hexane solution (2.5 M, 10 mL, 25.3 mmol) was gradually and dropwise added to a tetrahydrofuran (20 mL) solution of benzenesulfonic acid anhydride (2 g, 12.6 mmol), and stirred for 1 hour while the temperature was raised up to room temperature. The reaction liquid was cooled down to −78° C., and phosphorus trichloride (1.0 mL, 12.6 mmol) was added thereto and stirred for 2 hours (reaction liquid B1).

Magnesium was dispersed in tetrahydrofuran (20 mL), and 1-bromo-2-methoxybenzene (2.3 g, 12.6 mmol) was added thereto and stirred at room temperature for 3 hours. This solution was dropwise added to the previous reaction liquid B1 at −78° C., and stirred for 1 hour (reaction liquid B2).

A normal butyllithium/hexane solution (2.5 M, 5.0 mL, 12.6 mmol) was gradually and dropwise added to a diethyl ether (20 mL) solution of 1-bromo-2-isopropylbenzene (2.5 g, 12.6 mmol) at −30° C., and stirred at room temperature for 2 hours. The solution was dropwise added to the previous reaction liquid B2 at −78° C., and stirred overnight at room temperature. LC-MS purity 60%/water (50 mL) was added thereto and acidified (pH<3) with hydrochloric acid added thereto. After extraction with methylene chloride (100 mL), this was dried with sodium sulfate, and the solvent was evaporated away. This was recrystallized with methanol to give 1.1 g of a white product.

$^1$H-NMR (CDCl$_3$, ppm): 8.34 (t, J=6.0 Hz, 1H), 7.7-7.6 (m, 3H), 7.50 (t, J=6.4 Hz, 1H), 7.39 (m, 1H), 7.23 (m, 1H), 7.1-6.9 (m, 5H), 3.75 (s, 3H), 3.05 (m, 1H), 1.15 (d, J=6.8 Hz, 3H), 1.04 (d, J=6.4 Hz, 3H).
$^{31}$P-NMR (CDCl$_3$, ppm): −10.5.

3. Polymerization

Example 2-1

Ethylene/Norbornene-2,3-dicarboxylic Acid Anhydride (NB-DCA)/methyl Acrylate Ternary Copolymerization 200 μmol of bis(dibenzylideneacetone)palladium and phosphorus-sulfonic acid ligand (II) were weighed in a fully nitrogen-purged 30-mL flask, then dewatered toluene (10 mL) was added thereto and processed for 20 minutes with an ultrasonic vibrator to prepare a catalyst slurry. Next, a stainless autoclave having an internal volume of 2.4 L and equipped with an induction stirrer was purged with pure nitrogen, and methyl acrylate (comonomer concentration 0.2 mol/L), norbornene-2,3-dicarboxylic acid anhydride (comonomer concentration 0.2 mol/L) and pure toluene were introduced into the autoclave in a pure nitrogen atmosphere (total volume 800 mL). The previously prepared catalyst solution was added thereto, and polymerization was started at a polymerization temperature of 80° C. and under an ethylene pressure of 1 MPa. During the reaction, the temperature was kept constant, and ethylene was continuously fed so as to keep the pressure.

After the polymerization, ethylene was purged away, then the autoclave was cooled to room temperature, and the obtained polymer was reprecipitated in acetone (1 L). The precipitated polymer was taken out through filtration. The solid polymer thus obtained through filtration was washed with acetone, dried at 60° C. under reduced pressure for 3 hours, and then finally the polymer was collected.

Vp 3.54×10$^5$ g/mol/h; Mw 87,000; Mw/Mn (value Q) 1.9; Tm 122.6° C.; MFR (2 kg) 1.90/(10 kg) 12.60; density 0.9501; comonomer content (norbornene-2,3-dicarboxylic acid anhydride) 0.07 mol %, (methyl acrylate) 0.72 mol %; methyl branching 0.46.

[Example 2-2] to [Example 2-], [Comparative Example 2-1] to [Comparative Example 2-3]

Copolymers were produced according to Example 2-1, except that the comonomer species, the comonomer concentration and the polymerization temperature were changed as in Table 3. The polymer properties evaluation results are collectively shown in Table 4.

TABLE 3

| Run | Catalyst | Comonomer 1 (Co1) | mol/L | Comonomer 2 (Co2) | mol/L | Temp ° C. | Activity g/mol/h |
|---|---|---|---|---|---|---|---|
| Example 2-1 | (I) | norbornene-2,3-dicarboxylic anhydride | 0.2 | methyl acrylate | 0.2 | 80 | 354,000 |
| Example 2-2 | (I) | norbornene-2,3-dicarboxylic anhydride | 0.2 | methyl acrylate | 0.5 | 80 | 444,000 |
| Example 2-3 | (I) | norbornene-2,3-dicarboxylic anhydride | 0.2 | methyl acrylate | 1.0 | 80 | 390,500 |
| Example 2-4 | (I) | norbornene-2,3-dicarboxylic anhydride | 0.2 | (4-glycidyloxy)-butyl acrylate | 0.2 | 80 | 77,800 |

TABLE 3-continued

| Run | Catalyst | Comonomer 1 (Co1) | mol/L | Comonomer 2 (Co2) | mol/L | Temp °C. | Activity g/mol/h |
|---|---|---|---|---|---|---|---|
| Example 2-5 | (I) | norbornene-2,3-dicarboxylic anhydride | 0.5 | (4-glycidyloxy)-butyl acrylate | 0.5 | 80 | 87,833 |
| Example 2-6 | (I) | norbornene-2,3-dicarboxylic anhydride | 0.2 | hexane | 0.2 | 86 | 2,352,857 |
| Example 2-7 | (I) | norbornene-2,3-dicarboxylic anhydride | 0.2 | norbornene | 0.2 | 80 | 2,980,000 |
| Comparative Example 2-1 | (II) | (4-glycidyloxy)-butyl acrylate | 0.2 | methyl acrylate | 0.2 | 100 | 310,286 |
| Comparative Example 2-2 | (I) | (4-glycidyloxy)-butyl acrylate | 0.2 | methyl acrylate | 0.2 | 80 | 189,333 |
| Comparative Example 2-3 | (II) | norbornene-2,3-dicarboxylic anhydride | 0.3 | — | — | 100 | 1,800,000 |

TABLE 4

| Run | GPC Mw | GPC Q | DSC Tm °C. | MFR @2.16 Kg g/10 min | FR / — | ρ g/cm³ | NMR Co1 mol % | NMR Co2 mol % | NMR Me Branch /1,000 C. | Adhesive Strength @EVOH gf/10 mm |
|---|---|---|---|---|---|---|---|---|---|---|
| Example 2-1 | 87,000 | 1.9 | 122.6 | 1.90 | 6.63 | 0.9501 | 0.07 | 0.72 | 0.46 | 2825 |
| Example 2-2 | 141,000 | 1.9 | 122.3 | 0.28 | 7.86 | 0.9342 | 0.01 | 0.82 | N.D. | 308 |
| Example 2-3 | 123,000 | 1.9 | 118.0 | 0.66 | 5.94 | 0.9345 | 0.01 | 1.25 | N.D. | 1107 |
| Example 2-4 | 124,000 | 2.1 | 128.9 | 0.06 | 22.83 | 0.9451 | 0.02 | 0.17 | 0.05 | 952 |
| Example 2-5 | 118,000 | 2.4 | 121.8 | 0.02 | 35.45 | 0.9448 | 0.04 | 0.33 | 0.06 | 1780 |
| Example 2-6 | 85,000 | 2.0 | 125.8 | 1.35 | 6.89 | 0.9392 | 0.09 | 2.10 | 0.20 | 2495 |
| Example 2-7 | 87,000 | 1.9 | 112.6 | 1.20 | 5.92 | 0.9331 | 0.03 | 2.20 | 0.10 | 1560 |
| Comparative Example 2-1 | 41,000 | 1.8 | 111.1 | 45.70 | — | 0.9565 | 1.30 | 1.50 | 1.43 | 23 |
| Comparative Example 2-2 | 254,000 | 2.1 | 122.3 | 0.06 | 9.36 | 0.9374 | 0.36 | 0.29 | 0.01 | 125 |
| Comparative Example 2-3 | 42,000 | 2.1 | 118.2 | 23.00 | — | 0.9572 | — | 0.90 | N.D. | 110 |

4. Speculations on Results of Examples and Comparative Examples

In Table 3 and Table 4, Examples 2-1 to 2-7 demonstrated production of multinary (ternary) copolymers containing a polar commoner as the monomer component therein and containing a norbornene skeleton-having polar comonomer as the polar monomer component therein.

As a result of adhesiveness evaluation, it has been clarified that the adhesiveness of the copolymers of the present invention remarkably betters as compared with that of the copolymers in Comparative Examples 2-1 to 2-3 not using the ternary comonomer in the present invention, and the usefulness of the copolymers of the present invention has been thereby verified.

Experimental Example, Part 3

Composition of Polar Group-Containing Copolymer (A)+ other Resin (B)

In Experimental Example, Part 3, the test methods for the physical properties of the copolymers and the test method for the obtained laminates are the same as those in the above-mentioned Experimental Example, Part 1.

Production Example 1

Production of Polar Group-Containing Olefin Copolymer (A-1)

100 μmol of palladium bis(dibenzylideneacetone) and phosphorus-sulfonic acid ligand (I) were weighed in a fully nitrogen-purged 30-mL flask, then dewatered toluene (10 mL) was added thereto and processed for 10 minutes with an ultrasonic vibrator to prepare a catalyst slurry.

Next, a stainless autoclave having an internal volume of 2.4 L and equipped with an induction stirrer was purged with pure nitrogen, and pure toluene and 5-norbornene-2,3-dicarboxylic acid anhydride were introduced into the autoclave in a pure nitrogen atmosphere to have a polar group-containing monomer concentration of 1.0 mol/L.

The previously prepared catalyst solution was added thereto, and polymerization was started at 100° C. and under an ethylene pressure of 1 MPa. During the reaction, the temperature was kept at 100° C., and ethylene was continuously fed so as to keep the pressure.

After the polymerization, ethylene was purged away, then the autoclave was cooled to room temperature, and the obtained polar group-containing olefin copolymer (A-1) was reprecipitated in acetone (1 L). The precipitated copolymer was taken out through filtration. The solid polar group-containing olefin copolymer (A-1) thus obtained through filtration was washed with acetone, dried at 60° C. under reduced pressure for 3 hours, and then finally the polar group-containing olefin copolymer (A-1) was collected. The polymerization condition and the activity are shown in Table 5.

Production Examples 2 to 4

Production of Polar Group-Containing Olefin Copolymers (A-2, A-3, A-4)

Polar group-containing olefin copolymers of Production Examples 2 to 4 (A-2, A-3, A-4) were prepared through polymerization according to the method of Production Example 1, except that the ligand species, the ligand amount, the polar group-containing monomer species, the polar group-containing monomer concentration, the polymerization pressure, the polymerization temperature and the polymerization time were changed. The polymerization condition and the activity are shown in Table 5. The chemical formulae of the ligand species (I) to (III) in Table 5 are shown below.

The analysis data of the polar group-containing olefin copolymers obtained in Production Examples (A-2, A-3, A-4) are shown in Table 6. In Table 6, the end introduction means the polar group-containing structural unit amount of the polar group-containing monomer introduced into the end of the copolymer; the main chain introduction means the polar group-containing structural unit amount of the polar group-containing monomer introduced inside the molecular chain (main chain) thereof; and the total structural units mean the total amount of the introduced polar group-containing structural units.

[Chem. 20]

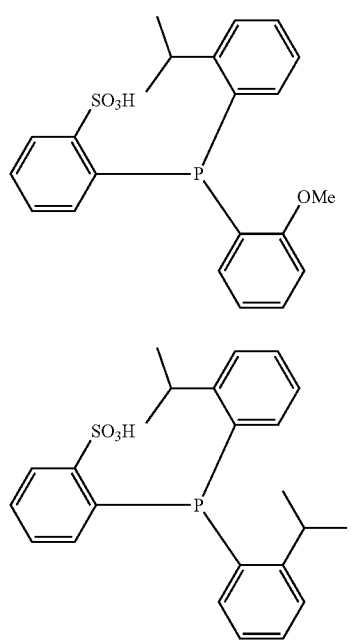

(I)

(II)

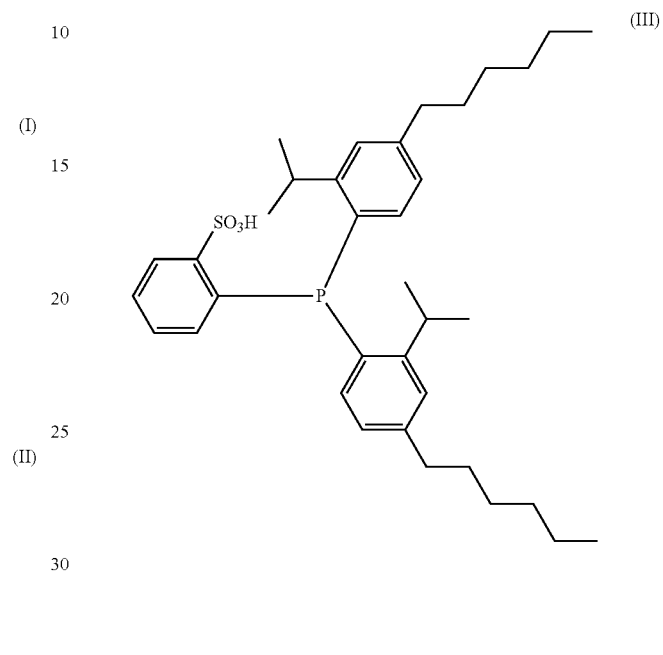

(III)

TABLE 5

| RUN | Ligand Species | Ligand Amount µmol | Polar Group-Containing Monomer Species | Polar Group-Containing Monomer Amount mol/l | Polymerization Condition pressure MPa | temperature ° C. | time min | Yield g | Activity g/mol/MPa h |
|---|---|---|---|---|---|---|---|---|---|
| Production Example 1 | III | 20 | 5-Norbornene-2,3-dicarboxylic Anhydride | 0.30 | 1.0 | 100 | 240 | 102.3 | 1.3E+0.6 |
| Production Example 2 | I | 40 | 5-Norbornene-2,3-dicarboxylic Anhydride | 0.25 | 1.0 | 100 | 45 | 53.8 | 1.8E+0.6 |
| Production Example 3 | II | 50 | 5-Norbornene-2,3-dicarboxylic Anhydride | 0.30 | 0.9 | 100 | 180 | 101.5 | 7.5E+0.5 |
| Production Example 4 | II | 30 | (2,7-octadien-1-yl)succinic anhydride | 0.20 | 1.0 | 80 | 90 | 85.3 | 1.9E+0.6 |

TABLE 6

| | Weight-Average Molecular Weight Mw * 10$^{-4}$ | Molecular Weight Distribution Parameter Mw/Mn | Melting Point ° C. | Polar Group Structural Unit Amount | | |
|---|---|---|---|---|---|---|
| | | | | end introduction mol % | main chain introduction mol % | total structural units mol % |
| Production Example 1 | 7.9 | 2.1 | 128.8 | 0.03 | 0.11 | 0.14 |
| Production Example 2 | 4.2 | 2.1 | 118.2 | 0.02 | 0.88 | 0.90 |
| Production Example 3 | 6.8 | 2.1 | 129.9 | 0.02 | 0.10 | 0.12 |
| Production Example 4 | 8.9 | 2.0 | 128.9 | — | 0.24 | 0.24 |

Example 3-1

0.4 g of the polar group-containing olefin copolymer (A-1) and 7.6 g of a linear low-density polyethylene (Japan Polyethylene's product name, F30HG, expressed as "LLDPE" in the table) were dry-blended, put into a small-size double-screw kneader (DSM Xplore's Model MC15), and melt-kneaded therein for 5 minutes. In the process, the barrel temperature was 200° C., and the screw revolution was 100 rpm. After 5 minutes, a rod-shaped resin composition was extruded out of the resin spout, put on a stainless tray, and cooled at room temperature and solidified. The cooled resin composition was cut into pellets to prepare pellets of the resin composition. The obtained resin composition pellets were tested for the above-mentioned adhesive strength measurement to measure the adhesive strength thereof. The results of the adhesive strength measurement are shown in Table 7.

Examples 3-2 to 3-8, 3-24, 3-25

Resin compositions of Examples 3-2 to 3-8, 3-24, and 3-25 were produced according to the method described in Example 3-1, except that the type of the polar group-containing olefin copolymer and the blend ratio of the polar group-containing olefin copolymer and the linear low-density polyethylene were changed. The blend ratio of the starting material resins and the results of the adhesive strength measurement are shown in Table 7.

Comparative Example 3-1

8.0 g of the polar group-containing olefin copolymer (A-1) alone was melt-kneaded according to the same method as in Example 3-1 to prepare pellets of the polar group-containing olefin copolymer (A-1) alone. The obtained pellets were tested for the above-mentioned adhesive strength measurement to measure the adhesive strength thereof. The result of the adhesive strength measurement is shown in Table 7.

Comparative Example 3-2

8.0 g of the polar group-containing olefin copolymer (A-2) alone was melt-kneaded according to the same method as in Example 3-1 to prepare pellets of the polar group-containing olefin copolymer (A-2) alone. The obtained pellets were tested for the above-mentioned adhesive strength measurement to measure the adhesive strength thereof. The result of the adhesive strength measurement is shown in Table 7.

Comparative Example 3-3

8.0 g of the linear low-density polyethylene (Japan Polyethylene's product name, F30HG) alone was melt-kneaded according to the same method as in Example 3-1 to prepare pellets of the linear low-density polyethylene alone. The obtained pellets were tested for the above-mentioned adhesive strength measurement to measure the adhesive strength thereof. The result of the adhesive strength measurement is shown in Table 7.

Comparative Examples 3-4 to 3-7

Resin compositions of Comparative Examples 3-4 to 3-7 were produced according to the method described in Example 3-1, except that the type of the polar group-containing olefin copolymer and the blend ratio of the polar group-containing olefin copolymer and the linear low-density polyethylene were changed. The blend ratio of the starting material resins and the results of the adhesive strength measurement are shown in Table 7.

Example 3-9

2.4 g of the polar group-containing olefin copolymer (A-3) and 5.6 g of a linear low-density polyethylene (Japan Polyethylene's product name, F30HG) were dry-blended, put into a small-size double-screw kneader (DSM Xplore's Model MC15), and melt-kneaded therein for 5 minutes. In the process, the barrel temperature was 200° C., and the screw revolution was 100 rpm. After 5 minutes, a rod-shaped resin composition was extruded out of the resin spout, put on a stainless tray, and cooled at room temperature and solidified. The cooled resin composition was cut into pellets to prepare pellets of the resin composition. The obtained resin composition pellets were tested for the above-mentioned adhesive strength measurement to measure the adhesive strength thereof. The manufacturer, the product name and the grade of the linear low-density polyethylene, the monomer species used for polymerization and the resin properties are shown in Table 8; and the results of the adhesive strength measurement are in Table 9. In Table 8, "HDPE" is a high-density polyethylene; "LDPE" is a high-pressure-process low-density polyethylene; and "LLDPE" is a linear low-density polyethylene.

Examples 3-10 to 3-22

Resin compositions of Examples 3-10 to 3-22 were produced according to the same method as in in Example 3-9, except that the linear low-density polyethylene in Example 3-9 was changed to the olefin resin shown in Table 9, and the adhesive strength thereof was measured. The manufacturer, the product name and the grade of the olefin resin, the monomer species used for polymerization and the resin properties are shown in Table 8; and the results of the adhesive strength measurement are in Table 9.

Example 3-23

A resin composition was produced according to the same method as in in Example 3-9, except that the polar group-containing olefin copolymer (A-3) in Example 3-9 was chanted to the polar group-containing olefin (A-4), and the adhesive strength thereof was measured. The manufacturer, the product name and the grade of the linear low-density polyethylene, the monomer species used for polymerization and the resin properties are shown in Table 8; and the result of the adhesive strength measurement is in Table 9.

Comparative Example 3-8

8.0 g of the polar group-containing olefin copolymer (A-3) alone was melt-kneaded according to the same method as in Example 3-9 to prepare pellets of the polar group-containing olefin copolymer (A-3) alone. The obtained pellets were tested for the above-mentioned adhesive strength measurement to measure the adhesive strength thereof. The result of the adhesive strength measurement is shown in Table 9.

Comparative Example 3-9

8.0 g of the polar group-containing olefin copolymer (A-4) alone was melt-kneaded according to the same method as in Example 3-9 to prepare pellets of the polar group-containing olefin copolymer (A-4) alone. The obtained pellets were tested for the above-mentioned adhesive strength measurement to measure the adhesive strength thereof. The result of the adhesive strength measurement is shown in Table 9.

TABLE 7

| | | | Example 3-1 | Example 3-2 | Example 3-3 | Example 3-4 | Example 3-5 | Example 3-6 | Example 3-7 | Example 3-8 | Example 3-24 | Example 3-25 |
|---|---|---|---|---|---|---|---|---|---|---|---|---|
| Blend Ratio of Resins in Resin Composition | A-1 | wt % | 5 | 25 | 50 | 75 | 0 | 0 | 0 | 0 | 0 | 0 |
| | A-2 | | 0 | 0 | 0 | 0 | 5 | 25 | 50 | 75 | 0.5 | 2.5 |
| | LLDPE | | 95 | 75 | 50 | 25 | 95 | 75 | 50 | 25 | 99.5 | 97.5 |
| Blend Ratio of Resins in Resin Composition | A-1 | part by weight | 100 | 100 | 100 | 100 | 0 | 0 | 0 | 0 | 0 | 0 |
| | A-2 | | 0 | 0 | 0 | 0 | 100 | 100 | 100 | 100 | 100 | 100 |
| | LLDPE | | 1900 | 300 | 100 | 33 | 1900 | 300 | 100 | 33 | 19900 | 3900 |
| Blend Ratio of Resins in Resin Composition | A-1 | amount/g | 0.4 | 2 | 4 | 6 | 0 | 0 | 0 | 0 | 0 | 0 |
| | A-2 | | 0 | 0 | 0 | 0 | 0.4 | 2 | 4 | 6 | 0.04 | 0.2 |
| | LLDPE | | 7.6 | 6 | 4 | 2 | 7.6 | 6 | 4 | 2 | 7.96 | 7.8 |
| Adhesive Strength | | g/10 mm | 2920 | 2460 | 1650 | 350 | 1190 | 800 | 400 | 180 | 1150 | 1100 |

| | | | Comparative Example 3-1 | Comparative Example 3-2 | Comparative Example 3-3 | Comparative Example 3-4 | Comparative Example 3-5 | Comparative Example 3-6 | Comparative Example 3-7 |
|---|---|---|---|---|---|---|---|---|---|
| Blend Ratio of Resins in Resin Composition | A-1 | wt % | 100 | 0 | 0 | 85 | 95 | 0 | 0 |
| | A-2 | | 0 | 100 | 0 | 0 | 0 | 85 | 95 |
| | LLDPE | | 0 | 0 | 100 | 15 | 5 | 15 | 5 |
| Blend Ratio of Resins in Resin Composition | A-1 | part by weight | 100 | 0 | 0 | 100 | 100 | 0 | 0 |
| | A-2 | | 0 | 100 | 0 | 0 | 0 | 100 | 100 |
| | LLDPE | | 0 | 0 | — | 18 | 5 | 18 | 5 |
| Blend Ratio of Resins in Resin Composition | A-1 | amount/g | 8 | 0 | 0 | 6.8 | 7.6 | 0 | 0 |
| | A-2 | | 0 | 8 | 0 | 0 | 0 | 6.8 | 7.6 |
| | LLDPE | | 0 | 0 | 8 | 1.2 | 0.4 | 1.2 | 0.4 |
| Adhesive Strength | | g/10 mm | 150 | 30 | 0 | 160 | 170 | 60 | 40 |

TABLE 8

| Grade | Manufacturer | Product Name | Resin Classification | Comonomer 1 | Comonomer 2 | Comonomer 3 | MFR g/10 min | Density g/cm³ |
|---|---|---|---|---|---|---|---|---|
| F30HG | Japan Polyethylene Corporation | NOVATEC | LLDPE | ethylene | 1-butene | — | 2 | 0.920 |
| Z50MG | Japan Polyethylene Corporation | NOVATEC | LLDPE | ethylene | 1-butene | — | 9 | 0.925 |
| UJ370 | Japan Polyethylene Corporation | NOVATEC | LLDPE | ethylene | 1-butene | — | 16 | 0.921 |
| F30FG | Japan Polyethylene Corporation | NOVATEC | LLDPE | ethylene | 1-butene | — | 1 | 0.921 |
| KS340T | Japan Polyethylene Corporation | KARNEL | LLDPE | ethylene | propylene | 1-hexene | 3.5 | 0.880 |
| KS560T | Japan Polyethylene Corporation | KARNEL | LLDPE | ethylene | propylene | 1-hexene | 16 | 0.898 |
| LF128 | Japan Polyethylene Corporation | NOVATEC | LDPE | ethylene | — | — | 0.3 | 0.922 |
| ZF33 | Japan Polyethylene Corporation | NOVATEC | LDPE | ethylene | — | — | 1 | 0.920 |
| LF441B | Japan Polyethylene Corporation | NOVATEC | LDPE | ethylene | — | — | 2 | 0.924 |
| NF464N | Japan Polyethylene Corporation | HARMOLEX | LLDPE | ethylene | 1-hexene | — | 2 | 0.918 |
| HS330P | Japan Polyethylene Corporation | NOVATEC | HDPE | ethylene | 1-butene | — | 0.4 | 0.951 |
| HS430P | Japan Polyethylene Corporation | NOVATEC | HDPE | ethylene | 1-butene | — | 0.8 | 0.956 |
| P-0280 | Mitsui Chemicals, Inc. | TAFMER | ethylene-propylene rubber | ethylene | propylene | — | 3 | 0.870 |
| 8180 | DuPont Dow | ENGAGE | ethylene-octene copolymer | ethylene | 1-octene | — | 0.5 | 0.863 |

TABLE 9

| | | Example 3-9 | Example 3-10 | Example 3-11 | Example 3-12 | Example 3-13 | Example 3-14 | Example 3-15 | Example 3-16 | Example 3-17 |
|---|---|---|---|---|---|---|---|---|---|---|
| A-3 | part by weight | 100 | 100 | 100 | 100 | 100 | 100 | 100 | 100 | 100 |
| A-4 | | | | | | | | | | |
| F30HG | | 233 | | | | | | | | |
| Z50MG | | | 233 | | | | | | | |
| UJ370 | | | | 233 | | | | | | |
| F30FG | | | | | 233 | | | | | |
| KS340T | | | | | | 233 | | | | |
| KS560T | | | | | | | 233 | | | |
| LF128 | | | | | | | | 233 | | |
| ZF33 | | | | | | | | | 233 | |

TABLE 9-continued

| | | | | | | | | | | |
|---|---|---|---|---|---|---|---|---|---|---|
| LF441B | | | | | | | | | | 233 |
| NF464N | | | | | | | | | | |
| HS330P | | | | | | | | | | |
| HS430P | | | | | | | | | | |
| P-0280 | | | | | | | | | | |
| 8180 | | | | | | | | | | |
| Adhesive Strength | g/10 mm | 780 | 820 | 480 | 1800 | 3560 | 2280 | 530 | 930 | 520 |

| | | Example 3-18 | Example 3-19 | Example 3-20 | Example 3-21 | Example 3-22 | Example 3-23 | Comparative Example 3-8 | Comparative Example 3-9 |
|---|---|---|---|---|---|---|---|---|---|
| A-3 | part by weight | 100 | 100 | 100 | 100 | 100 | | 100 | |
| A-4 | | | | | | | 100 | | 100 |
| F30HG | | | | | | | 233 | | |
| Z50MG | | | | | | | | | |
| UJ370 | | | | | | | | | |
| F30FG | | | | | | | | | |
| KS340T | | | | | | | | | |
| KS560T | | | | | | | | | |
| LF128 | | | | | | | | | |
| ZF33 | | | | | | | | | |
| LF441B | | | | | | | | | |
| NF464N | | 233 | | | | | | | |
| HS330P | | | 233 | | | | | | |
| HS430P | | | | 233 | | | | | |
| P-0280 | | | | | 233 | | | | |
| 8180 | | | | | | 233 | | | |
| Adhesive Strength | g/10 mm | 1090 | 1770 | 1390 | 2300 | 2660 | 1170 | 120 | 130 |

Speculations on Results of Examples and Comparative Examples

The resin compositions of Examples 3-1 to 3-8, 3-24 and 3-25 containing a linear low-density polyethylene in an amount within a range of from 25 to 100,000 parts by weight relative to 100 parts by weight of the polar group-containing olefin copolymer therein all have noticeably improved adhesion performance, as compared with the polar group-containing olefin copolymer alone of Comparative Example 3-1 and Comparative Example 3-2. Comparative Example 3-3 is a linear low-density polyethylene alone, and could not exhibit adhesiveness to different materials. Further, in Comparative Examples 3-4 to 3-7, the amount of the linear low-density polyethylene was less than 25 parts by weight relative to 100 parts by weight of the polar group-containing olefin copolymer therein, and therefore the resin compositions provided little improvement of adhesion performance. Examples 3-1 to 3-4, 3-24, 3-25, and Comparative Example 3-1 and Comparative Examples 3-3 to 3-5 are summarized in FIG. 2; and Examples 3-5 to 3-8, and Comparative Examples 3-2, 3-3, 3-6 and 3-7 are in FIG. 3. As in FIG. 2 and FIG. 3, when the content of the polar group-containing olefin copolymer is 80 wt % or less, or that is, when the content of LLDPE is not more than 25 parts by weight relative to 100 parts by weight of the polar group-containing olefin copolymer, then the adhesiveness of the resin compositions increased as compared with that of the others where the content of LLDPE is lower than the above. Otherwise, when the LLDPE content is not more than 100,000 parts by weight, the adhesiveness of the resin compositions increased as compared with that of the others where the content is more than the above.

This fact indicates that the resin compositions containing an olefin resin in an amount falling within a range of from 25 to 100,000 parts by weight relative to 100 parts by weight of the polar group-containing olefin copolymer therein exhibit adhesiveness.

In Examples 3-9 to 3-22, various types of olefin resins are incorporated in an amount of 233 parts by weight relative to 100 parts by weight of the polar group-containing olefin copolymer therein. Irrespective of the value MFR and the density of the olefin resin and of the monomer species used for polymerization, the resin compositions of these Examples have remarkably improved adhesion performance as compared with the polar group-containing olefin copolymer alone of Comparative Example 3-8. This fact indicates that, irrespective of the type and the physical properties of the olefin resin therein, compositions of a polar group-containing olefin copolymer and an olefinic resin blended in a blend ratio falling within a specific range exhibit improved adhesiveness.

In Example 3-23, the type of the polar group-containing monomer used for polymerization to give the polar group-containing olefin copolymer differs from those used in Examples 3-9 to 3-22. The resin composition of Example 3-23 comprising a linear low-density polyethylene in an amount of 233 parts by weight relative to 100 parts by weight of the polar group-containing olefin copolymer has remarkably improved adhesion performance as compared with the polar group-containing olefin copolymer alone of Comparative Example 3-9. This fact indicates that, irrespective of the type of the polar group-containing monomer to be used for polymerization to give the polar group-containing olefin copolymer, compositions of a polar group-containing olefin copolymer and an olefinic resin blended in a blend ratio falling within a specific range exhibit improved adhesiveness.

The above-mentioned good results of Examples and the comparison thereof to Comparative Examples have clarified the significance and the reasonability of the constitution of the present invention (specified matters of invention) and the superiority thereof over prior art.

While the present invention has been described in detail and with reference to specific embodiments thereof, it will be apparent to one skilled in the art that various changes and modifications can be made therein without departing from the spirit and scope thereof. The present application is based on a Japanese patent application filed Dec. 23, 2011 (Application No. 2011-288521), a Japanese patent application filed Mar. 30, 2012 (Application No. 2012-80294), and a Japanese patent application filed Mar. 31, 2012 (Application No. 2012-83336), the contents of which are herein incorporated by reference.

INDUSTRIAL APPLICABILITY

The polar group-containing olefin copolymer (A'), the multinary polar olefin copolymer (A") and the olefin resin composition (C) of the present invention express high adhesiveness to any other substrate, and have made it possible to produce industrially useful laminates. In addition, these have not only excellent adhesiveness but also excellent mechanical and thermal properties, and are applicable to useful multilayer molded articles. As laminated with various substrates, these are utilized widely in the field of wrapping materials and packaging containers; in the field of various industrial materials for fibers, pipes, fuel tanks, hollow containers, barrels, etc.; in the field of civil engineering for water stop materials, etc.; in the field of electronics for electronic/household electrical appliance members, etc.; in the field of wiring for electric wires, cables, etc.

The invention claimed is:
1. A method of producing a polar group-containing olefin copolymer, the method comprising:
copolymerizing at least one nonpolar monomer selected from the group consisting of ethylene and α-olefins having from 3 to 20 carbon atoms, and at least one polar group-containing monomer comprising a carboxyl group or a dicarboxylic acid anhydride group, in the presence of a transition metal catalyst comprising a chelating ligand and a metal atom selected from the group consisting of a platinum atom, a cobalt atom, a nickel atom, a palladium atom, and a rhodium atom, represented by the following structural formula (C), to obtain a polar group-containing olefin copolymer,
wherein the polar group-containing olefin copolymer is a random copolymer and satisfies the following requirements 1) to 3):
1) an amount of structural unit derived from the polar group-containing monomer in the polar group-containing olefin copolymer is from 0.001 to 10 mol %;
2) a weight-average molecular weight (Mw) of the copolymer, as obtained through gel permeation chromatography (GPC), is from 45,000 to 1,000,000; and
3) a melting point, as represented by a temperature at a position of maximum peak in the absorption curve measured with a differential scanning calorimeter, is from 50° C. to 140° C.,

Structural Formula (C)

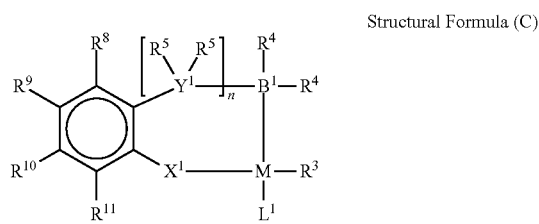

wherein in the structural formula (C), M represents the above-mentioned transition metal; $X^1$ represents an oxygen atom; $Y^1$ represents carbon or silicon; n indicates an integer of 0 or 1; $E^1$ represents phosphorus, arsenic or antimony; $R^3$ and $R^4$ each independently represent a hydrogen atom or a hydrocarbon group having from 1 to 30 carbon atoms and optionally containing a hetero atom; $R^5$ each independently represents a hydrogen atom, a halogen atom, or a hydrocarbon group having from 1 to 30 carbon atoms and optionally containing a hetero atom; $R^8$, $R^9$, $R^{10}$, and $R^{11}$ each independently represent a hydrogen atom, a halogen atom, a hydrocarbon group having from 1 to 30 carbon atoms and optionally containing a hetero atom, $OR^2$, $CO_2R^2$, $CO_2M'$, $C(O)N(R^1)_2$, $C(O)R^2$, $SR^2$, $SO_2R^2$, $SOR^2$, $OSO_2R^2$, $P(O)(OR^2)_{2-y}(R^1)_y$, $CN$, $NHR^2$, $N(R^2)_2$, $Si(OR^1)_{3-x}(R^1)_x$, $OSi(OR^1)_{3-x}(R^1)_x$, $NO_2$, $SO_3M'$, $PO_3M'_2$, $P(O)(OR^2)_2M'$ or an epoxy-containing group; M' represents an alkali metal, an alkaline earth metal, ammonium, a quaternary ammonium or phosphonium, x indicates an integer of from 0 to 3, y indicates an integer of from 0 to 2; Multiple groups suitably selected from $R^8$ to $R^{11}$ optionally bond to each other to form an alicyclic ring, an aromatic ring, or a hetero ring containing a hetero atom selected from oxygen, nitrogen and sulfur; In this case, the number of the ring-constituting atoms is from 5 to 8, and the ring optionally has a substituent thereon; $R^1$ represents a hydrogen atom, or a hydrocarbon group having from 1 to 20 carbon atoms; $R^2$ represents a hydrocarbon group having from 1 to 20 carbon atoms; $L^1$ represents a ligand coordinating with M; $R^3$ and $L^1$ optionally bond to each other to form a ring.

2. The method according to claim 1, wherein an amount of structural unit derived from the polar group-containing monomer contained inside the polymer chain is larger than an amount of structural unit derived from the polar group-containing monomer contained at an end of the molecular chain.

3. The method according to claim 1, wherein a ratio (Mw/Mn) of the weight-average molecular weight (Mw) to a number-average molecular weight (Mn), as obtained through gel permeation chromatography, falls within a range of from 1.5 to 3.5.

4. The method according to claim 1, wherein the transition metal catalyst is a transition metal catalyst where a triaryl phosphine compound is coordinated with a palladium atom or a nickel atom.

5. The method according to claim 1, wherein the transition metal catalyst is a transition metal catalyst where a triarylarsine compound is coordinated with a palladium atom or a nickel atom.

6. The method according to claim 1, wherein the polar group-containing monomer comprises a dicarboxylic acid anhydride group.

7. The method according to claim 1, wherein the polar group-containing monomer comprises a carboxyl group.

8. The method according to claim 1, wherein the polar group-containing monomer is selected from the group consisting of acrylic acid, methacrylic acid, maleic acid, fumaric acid, tetrahydrophthalic acid, itaconic acid, citraconic acid, crotonic acid, isocrotonic acid, norbornenedicarboxylic acid, and bicyclo[2,2,1]hept-2-ene-5,6-dicarboxylic acid.

9. The method according to claim 1, wherein the polar group-containing monomer is selected from the group consisting of maleic anhydride, itaconic anhydride, citraconic anhydride, tetrahydrophthalic anhydride, 5-norbornene-2,3-dicarboxylic anhydride, 3,6-epoxy-1,2,3,6-tetrahydrophthalic anhydride, tetracyclo[6.2.1.1$^{3,6}$.0$^{2,7}$]dodec-9-ene-4,5-dicarboxylic anhydride, and 2,7-octadien-1-yl-succinic anhydride.

10. The method according to claim 1, wherein the polar group-containing monomer is selected from the group consisting of 2,7-octadien-1-yl-succinic anhydride, 5-norbornene-2,3-dicarboxylic anhydride, and 3,6-epoxy-1,2,3,6-tetrahydrophthalic anhydride.

11. The method according to claim 1, wherein the polymerization pressure ranges from 2.5 to 100 MPa and the polymerization temperature ranges from 100 to 290° C.

12. The method according to claim 1, wherein the polar group-containing monomer comprises a dicarboxylic acid anhydride group, the polymerization pressure ranges from 2.5 to 100 MPa, and the polymerization temperature ranges from 100 to 290° C.

\* \* \* \* \*